United States Patent
Gustavsson

(10) Patent No.: US 11,193,552 B2
(45) Date of Patent: Dec. 7, 2021

(54) FREQUENCY TUNED DAMPER AND A METHOD FOR MANUFACTURING SUCH A DAMPER

(71) Applicant: VIBRACOUSTIC FORSHEDA AB, Forsheda (SE)

(72) Inventor: Bengt-Göran Gustavsson, Bredaryd (SE)

(73) Assignee: VIBRACOUSTIC FORSHEDA AB, Forsheda (SE)

( * ) Notice: Subject to any disclaimer, the term of this patent is extended or adjusted under 35 U.S.C. 154(b) by 82 days.

(21) Appl. No.: 16/645,932

(22) PCT Filed: Oct. 9, 2018

(86) PCT No.: PCT/EP2018/077395
§ 371 (c)(1),
(2) Date: Mar. 10, 2020

(87) PCT Pub. No.: WO2019/072796
PCT Pub. Date: Apr. 18, 2019

(65) Prior Publication Data
US 2020/0278007 A1    Sep. 3, 2020

(30) Foreign Application Priority Data
Oct. 9, 2017 (EP) .................................. 17195459

(51) Int. Cl.
*F16F 7/108* (2006.01)
*F16F 7/104* (2006.01)

(52) U.S. Cl.
CPC ...... *F16F 7/104* (2013.01); *F16F 2230/0017* (2013.01)

(58) Field of Classification Search
CPC .......... F16F 7/108; F16F 7/104; F16F 1/3732; F16F 2230/0017; F16F 2222/08
See application file for complete search history.

(56) References Cited

U.S. PATENT DOCUMENTS

| | | | | |
|---|---|---|---|---|
| 5,313,806 | A | * 5/1994 | Feng ..................... | F24F 1/0003 62/295 |
| 5,699,865 | A | 12/1997 | Förderer et al. | |
| 2006/0226299 | A1 * | 10/2006 | Tungl ..................... | F16F 15/08 248/58 |

FOREIGN PATENT DOCUMENTS

| | | |
|---|---|---|
| DE | 10 2005 009 677 A1 | 9/2006 |
| WO | WO 01/92752 A1 | 12/2001 |
| WO | WO 2008/127157 A1 | 10/2008 |
| WO | WO 2013/167524 A1 | 11/2013 |

OTHER PUBLICATIONS

International Search Report, issued in PCT/EP2018/077395, dated Jan. 2, 2019.
Written Opinion of the International Searching Authority, issued in PCT/EP2018/077395, dated Jan. 2, 2019.

* cited by examiner

*Primary Examiner* — Xuan Lan Nguyen
(74) *Attorney, Agent, or Firm* — Birch, Stewart, Kolasch & Birch, LLP

(57) ABSTRACT

A frequency tuned damper including at least one elastic element, and a method for the assembly of such a damper are disclosed. The damper comprises a deflection limiting mechanism arranged to prevent excessive movements of the elastic element if the damper is subjected to large external transient forces. The at least one elastic element forms part of the deflection limiting mechanism.

18 Claims, 13 Drawing Sheets

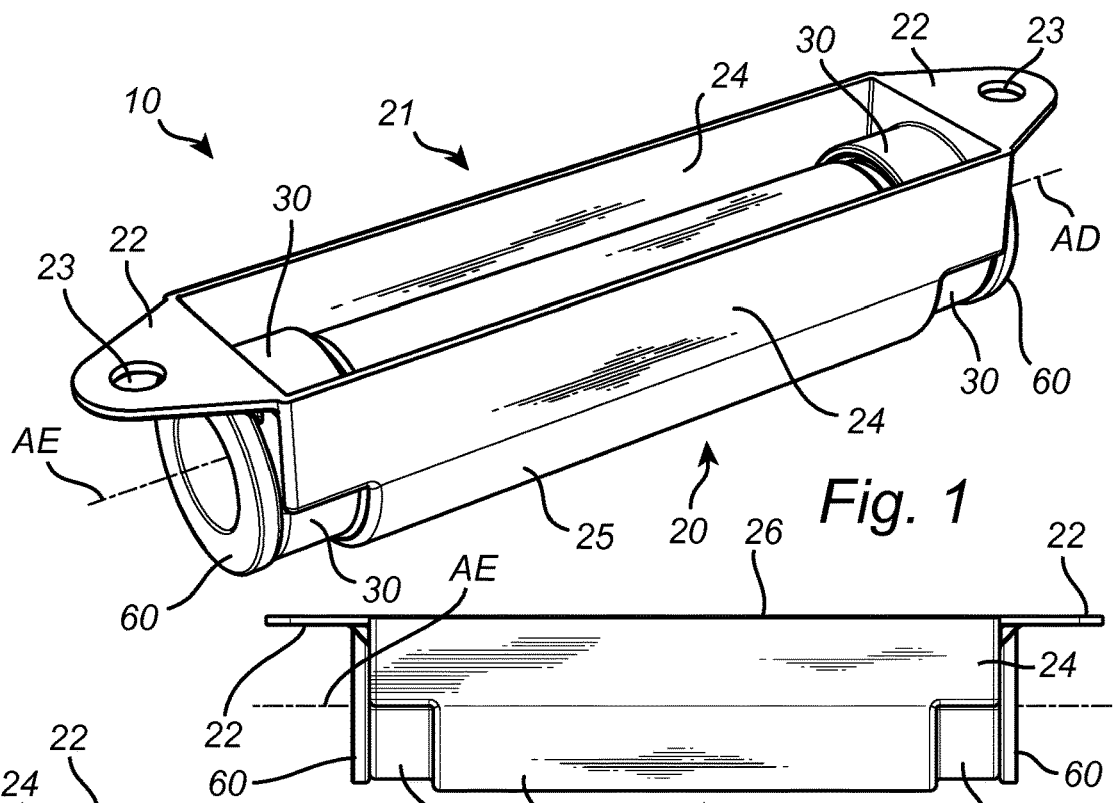
Fig. 1
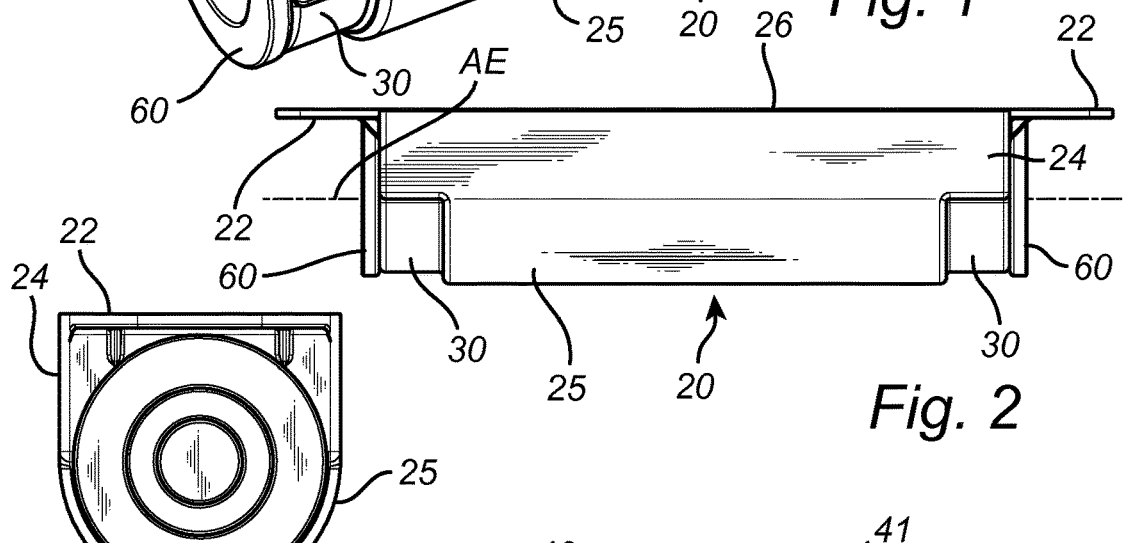
Fig. 2
Fig. 3
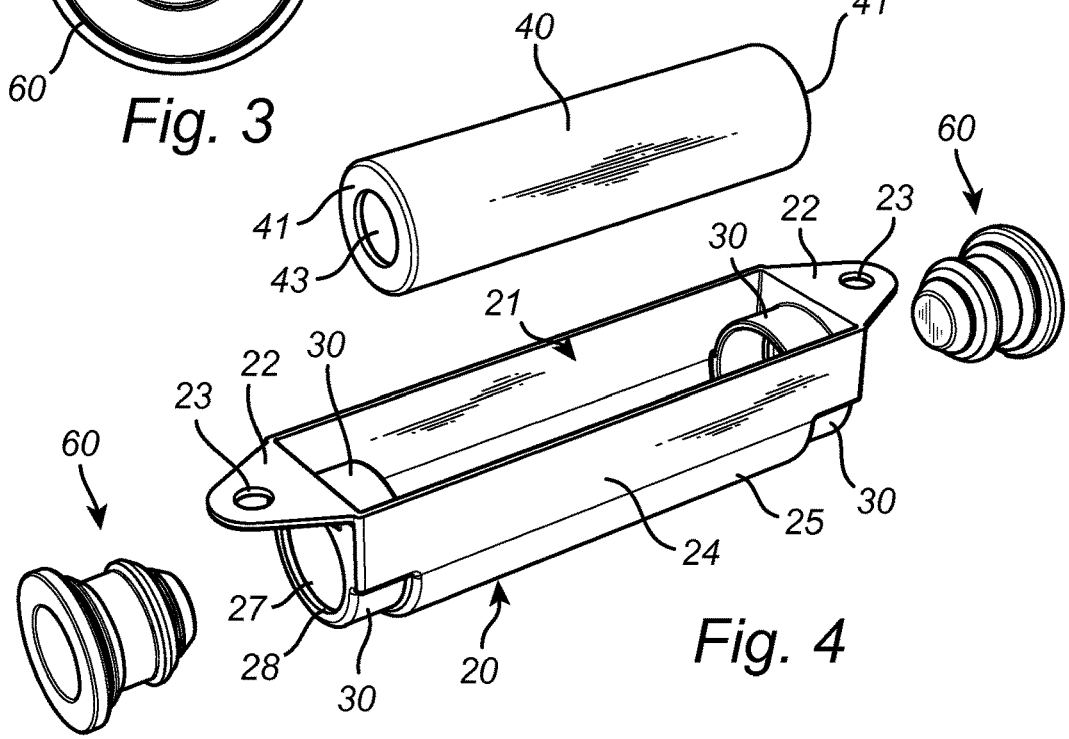
Fig. 4

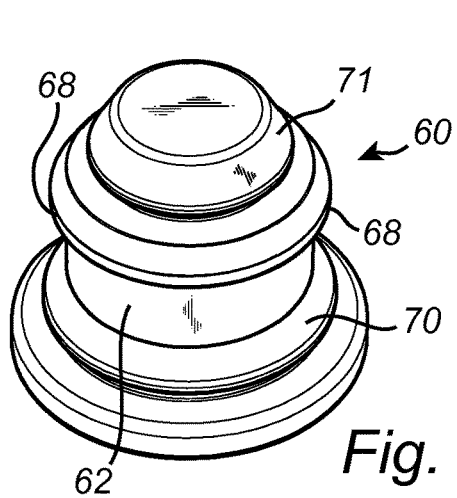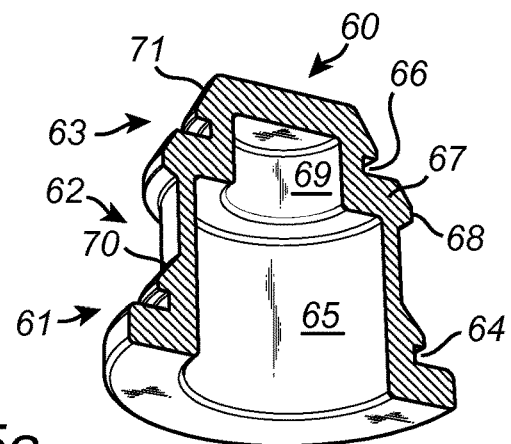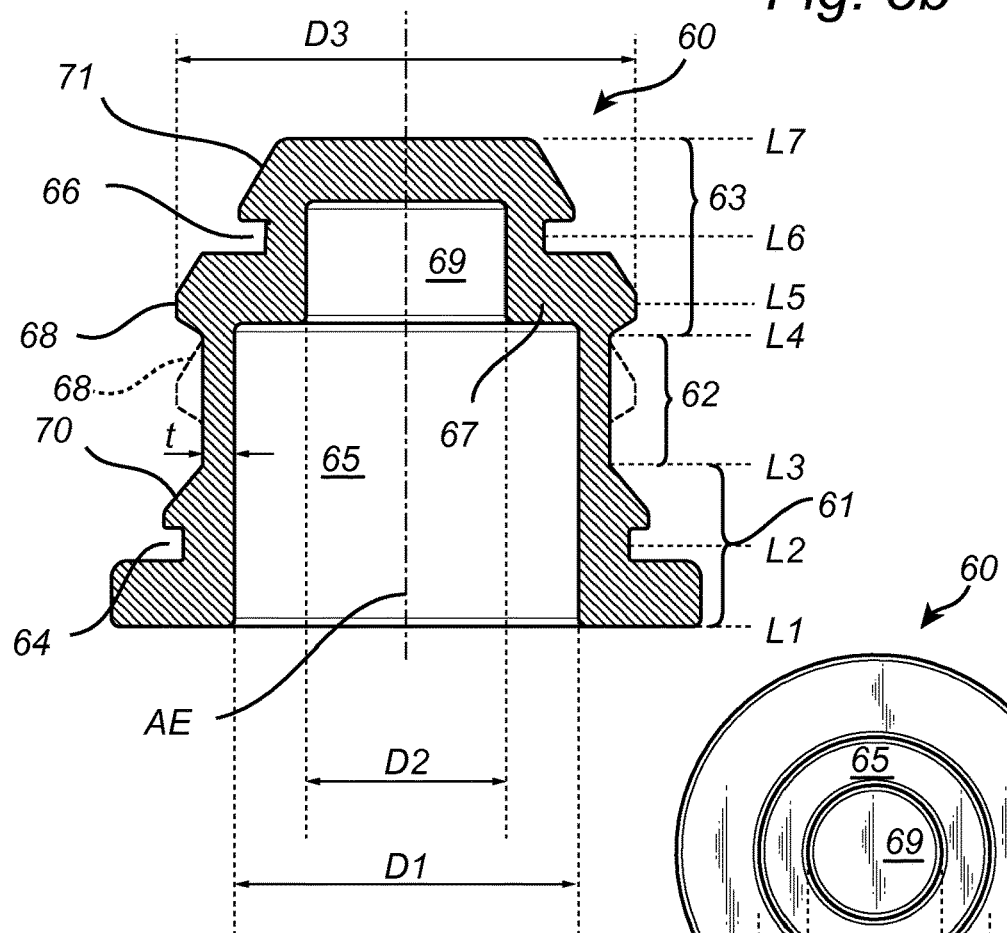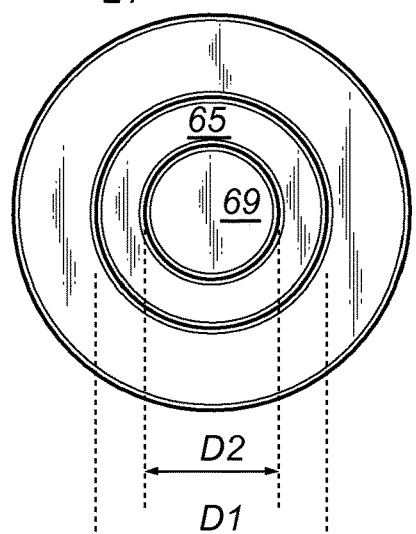
Fig. 5a
Fig. 5b
Fig. 5c
Fig. 5d

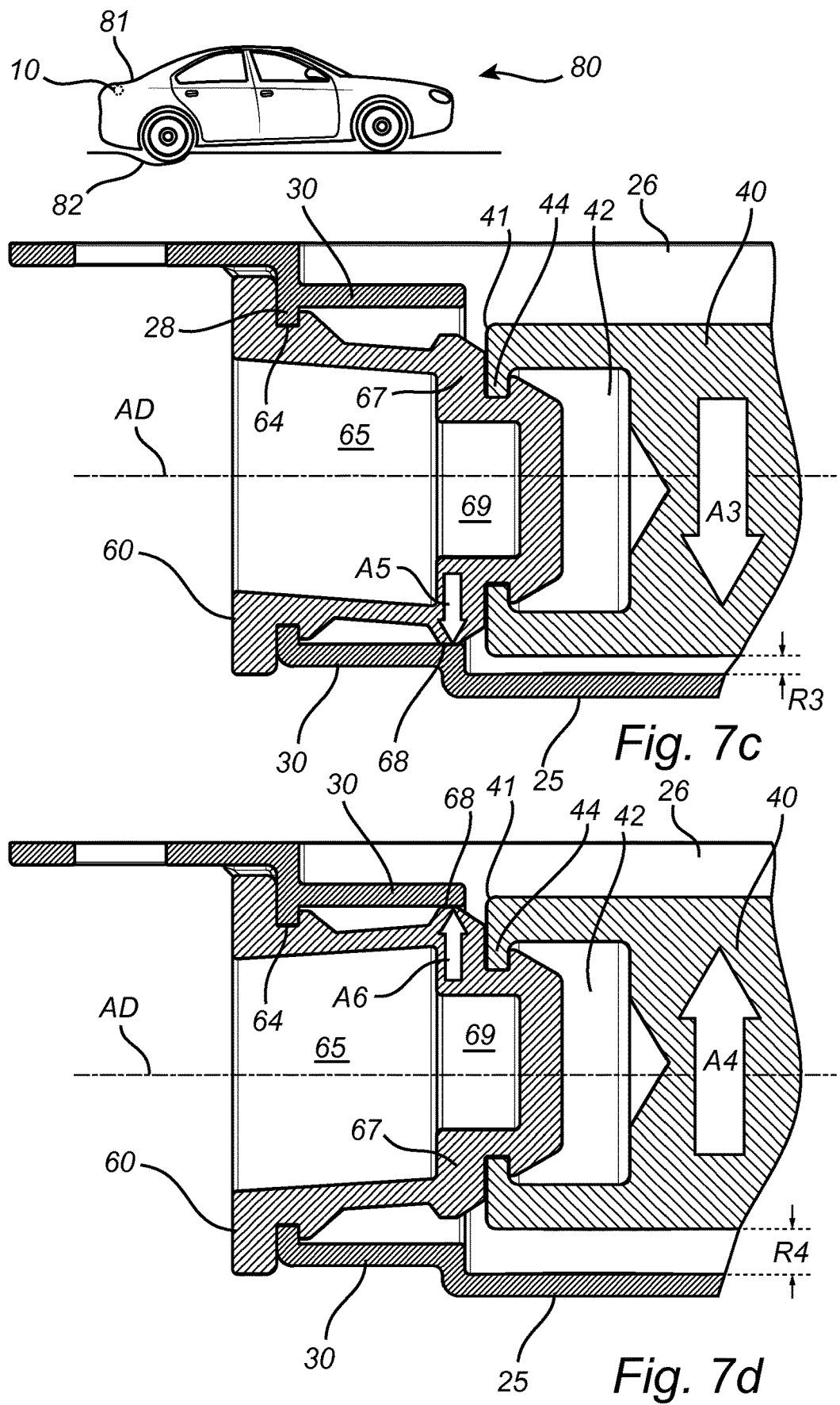

FREQUENCY TUNED DAMPER AND A METHOD FOR MANUFACTURING SUCH A DAMPER

TECHNICAL FIELD

The present disclosure relates to frequency tuned dampers that can be used, for instance, in a motor vehicle and which is arranged to be connected to a surface, termed vibrating surface, the vibrations of which are to be dampened. The frequency tuned damper has a mass acting as a vibration body, a console adapted to be connected to the vibrating surface, and at least one elastic element resiliently connecting the vibration body to the console. The elastic element has a base portion and a top portion disposed at spaced locations along a longitudinal axis of the elastic element. The damper may be used for dampening vibrations of the vibrating surface which are directed transversally to a longitudinal axis of the at least one elastic element, and optionally also for dampening vibrations which are directed along said longitudinal axis.

BACKGROUND

The function of frequency tuned vibration dampers, also termed tuned mass dampers or vibration absorbers, is based on a spring-mass system which counteracts and reduces vibrations in a surface, termed vibrating surface, to which the damper is connected. Such vibrations may be in directions parallel to the vibrating surface and/or transverse to the vibrating surface. WO 01/92752 A1, WO 2013/167524 A1, and WO 2008/127157 A1 disclose examples of frequency tuned vibration dampers.

In some uses of frequency tuned vibration dampers, the vibrating surface to which the damper is connected may be occasionally subjected to strong external transient forces. This is for example the case when a car, in which such a frequency tuned damper is mounted, is passing over a pothole in the road. In this situation, the inertia of the mass of the vibration body may tend to give rise to an excessive movement of the one or more elastic elements by which the vibration body is supported. This, in its turn, may damage the elastic elements to such an extent that they are worn out prematurely, resulting in reduced vibration damping and, in a worst case, that an elastic element is completely disconnected form the vibration body. Present solutions for preventing such excessive movements are unsatisfactory, and especially involves additional components and additional assembly time and costs.

SUMMARY OF INVENTION

In the light of the above, it is an object of the present inventive concept to provide a frequency tuned damper and a method for use in manufacturing a frequency tuned damper, wherein advantages are obtained with respect to preventing excessive movements in the damper if the damper is subjected to strong external transient forces, and especially advantages relating to the time and cost for manufacturing and assembly.

According to a first aspect of the inventive concept, there is provided a frequency tuned damper comprising:
a console which is arranged to be connected to a surface, termed vibrating surface, the vibrations of which are to be dampened, said console comprising at least one mounting opening defined by a mounting rim;
a vibration body; and
at least one elastic element having a longitudinal axis and comprising a base portion having a first circumferentially extending mounting groove in which the rim is received for connecting the elastic element to the console, and a top portion which is located at a distance along the longitudinal axis from the base portion, and is connected to the vibration body;
wherein the elastic element presents a circumferentially extending outer impact surface, which is located between the base portion and the vibration body, and wherein the console further comprises at least one deflection limiter which is integrally formed with the rim and extends circumferentially around the impact surface at a distance therefrom, said deflection limiter being arranged to limit the degree of movement of elastic element transversally to the longitudinal axis if the damper is subjected to an external transient force sufficient to bring the impact surface into contact with the deflection limiter, thereby preventing excessive movements of the elastic element transversally to the longitudinal axis.

According to a second aspect of the inventive concept, there is provided a method for use in manufacturing a frequency tuned damper, comprising:
inserting an elastic element, which has a base portion and a top portion located at a distance along a longitudinal axis from the base portion, through a mounting opening of a console to a mounted position in which the base portion is connected to the console, and in which a deflection limiter being integrally formed with the console extends circumferentially about and a distance from an outer impact surface of the elastic element, wherein the deflection limiter and the impact surface in said mounted position together form a deflection limiting mechanism preventing excessive movements of the elastic element transversally of the longitudinal axis; and
attaching the top portion of the elastic element to a vibration body, wherein the elastic element and the vibration body together form a frequency tuned spring-mass system.

Preferred embodiments of the inventive concept are set out in the dependent claims.

In some prior art frequency tuned dampers, separate elements are mounted between the vibration body and the console in order to prevent excessive movement of the vibration body in case the damper is subjected to substantial external forces. Using separate elements for limiting the movement of the mass involves both cost and assembly time, and a need to accurately position and fastening such a movement limiting element. Moreover, this prior art technique may not control the movements to a satisfactory degree.

The inventive concept presents at least the following advantages over this prior-art type of frequency tuned dampers:

Since said at least one deflection limiter is integrally formed with the rim, the assembly of the damper can be performed in a shorter time and with reduced costs. No separate elements will be needed for preventing excessive movement of the vibration mass, and no assembly time will be needed for attaching and correctly positioning such additional deflection limiting elements.

Since each deflection limiter is arranged to cooperate with an impact surface of an associated elastic element, the deflection limiting mechanism and function may be established as a direct result of inserting and connecting the elastic element. When the elastic element has been mounted in the mounting opening and has been connected to the console by the rim entering the mounting groove, the deflection limiting mechanism is established and in place. The deflection limiter can automatically be correctly positioned in relation to the impact surface of the mounted elastic element, extending about the impact surface at a distance therefrom.

In some prior art frequency tuned dampers, the console comprises a housing enclosing the vibration body at least in part, wherein the walls of the housing are used for limiting the movement of the vibration body. The inventive concept allows for a higher degree of freedom with respect to the design of the console. No house is required for the deflection limiting mechanism.

A specific drawback in some prior-art frequency tuned dampers is that the housing forming the console has one or more open sides, preventing the housing to limit the movement of the vibration body in certain directions. The inventive concept allows the deflection limiting function to operate in all possible movement directions of the elastic element since the deflection limiting mechanism is independent on the console design and the deflection limiter, if needed, may extend 360 degrees around the impact surface of the top portion of the elastic element.

Yet another advantage that may be obtained by the inventive concept lies in the fact that the deflection limiter of the console cooperates with the elastic element and not with the vibration body or mass as in the prior art. Thereby, the elastic properties of the elastic element will have a dual function: the elastic properties are used not only for establishing the spring effect in the frequency tuned mass-spring system, but also for establishing a deflection limiting mechanism together with the associated deflection limiter where the elastic properties will result in a soft or resilient engagement with the deflection limiter in case the damper is subjected to excessive external transient forces.

Terminology

In the present disclosure, the terms axial, radial, circumferential, transversally, and the like relate to directions in relation to the longitudinal or axial direction of the elastic elements or the damper.

Embodiments of the Inventive Concept

In some embodiments, said at least one mounting opening of the console comprises a plurality of mounting openings each defined by an associated mounting rim, and said at least one elastic element comprises a plurality of elastic elements, each elastic element being connected to the console at an associated mounting rim. In such embodiments involving two or more elastic elements, the console may comprise one deflection limiter for each elastic element, such that each deflection limiter may extend circumferentially around the impact surface of an associated one of the elastic elements at a distance therefrom. In some embodiments, it is also possible to have a "mix" of one or more deflection-limited elastic elements and one or more elastic elements which do not have an associated deflection limiter.

In embodiments where the vibration body is supported by a plurality of elastic elements, different configurations of the elements are possible:

In one configuration, the plurality of elastic elements may comprise a first elastic element and a second elastic element which are connected to the vibration body on opposite sides thereof, and are aligned along a common longitudinal axis. The console may comprise a first deflection limiter associated with the first elastic element and a second deflection limiter associated with the second elastic limiter.

In a second configuration, the plurality of elastic elements may comprise two or more elastic elements of which the longitudinal axes are parallel and non-coinciding, and which are connected to a common surface of the console and to a common side of the vibration body.

The first and the second configuration described above may be combined: As an example, the damper may include four elastic elements each having its own associated deflection limiter, wherein two elastic elements are arranged next to each other on a first side of the vibration body, and two elastic elements are arranged next to each other on a second opposite side of the vibration body. By this arrangement, excessive torsional movements of the vibration body may effectively be prevented by the four deflection limiters operating in combination.

In some embodiments, the console may comprise a housing in which the vibration body is arranged and supported by the said plurality of elastic elements. The distance between each deflection limiter and the impact surface of an associated elastic element may then preferably be selected sufficiently small in relation to the distance between the vibration body and the housing to ensure that the vibration body is prevented from impacting against said housing when the damper is subjected to strong external transient forces.

Such a housing may have at least one open side through which the vibration body may be inserted into the housing during the assembly of the damper. If the vibration body is supported on opposite sides by one or more elastic elements on each side, the distance between the associated deflection limiters on opposite sides of the vibration body is preferably large enough to allow the vibration body to be inserted through the open side of the housing into a position between the deflection limiters. The length of the vibration body in the longitudinal direction may be essentially equal to but somewhat smaller than said distance between the deflection limiters.

In some embodiments, the elastic element presents an increased outer diameter at the impact surface, in order to ensure that a deflection-limiting contact with the deflection limiter will occur at the location of the impact surface.

In preferred embodiments, the damper may further comprise an intermediary transition or wall portion extending between the base portion and the top portion. During normal damping operation of the damper, the intermediary wall portion may vibrate transversally of the longitudinal axis. Frequency damping may also be accomplished in the longitudinal direction. The frequency tuning of the damper may be accomplished by varying design parameters of the intermediary wall portion, such as the wall thickness of the wall portion, an angle of inclination of the wall portion or combinations thereof. In such embodiments, the impact surface may be provided entirely or partly in the top portion of the elastic element. In such embodiments, it may also be preferred to form the impact surface at a part of the elastic element having an increased outer diameter larger than an outer diameter of the intermediary wall portion. Thereby, the deflection limiting function may be essentially separated from the frequency tuning function of the elastic element.

For instance, the part of the elastic element which forms the outer impact surface may have an increased wall thickness and/or an increased amount of material in order to resist impacts against the deflection limiter, and in order to reduce the risk of the elastic element being disconnected from the vibration body as a result of unintended deformation of the elastic element when the impact surface strikes against the deflection limiter. In alternative embodiments, the impact surface may be formed partly or entirely on the intermediary wall portion.

In some embodiments, the at least one deflection limiter may extend circumferentially 360 degrees around the impact surface of the associated elastic element, ensuring a deflection limiting function in all transverse direction in relation to the longitudinal axis.

In one embodiment such 360-degree deflection limiting function may be obtained by means of a deflection limiter comprising a cylinder which extends along the elastic element at a distance therefrom, and which has a first end which is integrally formed with a surface of the console in which the mounting opening for the elastic element is formed, and an opposite second end located at the impact surface of the elastic element. During assembly of the damper, the top portion of the elastic element will thus be inserted through the mounting opening and through the cylinder until the elastic element is located in a mounted position in which the mounting groove of the base portion engages the rim and in which the impact surface is in level with the distal end of the cylinder.

According to the inventive concept, the at least one deflection limiter is integrally formed with the rim defining the mounting opening, i.e. it is an integral part of the console. In some embodiments, the entire console may be manufactured as one single piece or element, comprising one or more deflection limiters as integral parts, and in some embodiment also comprising a housing enclosing the vibration body at least in part, and optionally also comprising attachment means for connecting the console to the vibrating surface.

In other embodiments, the console may comprise a base element which is arranged to be connected to the vibrating surface, and one or more separate elements, here referred to as sleeve elements. The mounting opening, the rim and the deflection limiter associated with each elastic element may then be integrally formed into such a separate sleeve element. A damper including one or more such separate sleeve elements may be assembled according to different assembly alternatives:

According to a preferred first assembly alternative, the components are first lined up in relation to each other by loosely inserting each sleeve element into its associated opening in the base element, loosely inserting each elastic element into its associated sleeve element, and positioning the vibration body in relation to the base element. When the components have been lined up, each elastic sleeve element may be pushed into its connected position by a suitable tool, such that the elastic element engages its sleeve element and the vibration body, and such that the elastic element at the same time pushes the sleeve element into its mounted position in the base element.

According to a second assembly alternative, first each elastic element is inserted into and connected to its own sleeve element. This may be performed beforehand. Thereafter, the sleeve element with its pre-connected elastic element may be inserted into an opening of the base element of the console and secured to the base element in a suitable manner, while the elastic element at the same time is connected to the vibration body.

According to a third assembly alternative, first each sleeve element is inserted into and connected to the base element. Thereafter, each elastic element is inserted into and connected to its associated sleeve element.

In embodiments including such a separate sleeve element, the principle according to the inventive concept remains the same: Once the elastic element has been inserted into its mounting opening in the console the deflection limiting mechanism is fully established.

The above and other features of the inventive concept, and preferred embodiments and advantages thereof, are set out in the claims and will be described further in detail below.

BRIEF DESCRIPTION OF THE DRAWINGS

The inventive concept, some non-limiting embodiments and further advantages of the inventive concept will now be further described with reference to the drawings.

FIGS. 1 to 4 illustrate a first embodiment of a frequency tuned damper.

FIGS. 5a to 5d illustrate an elastic element.

FIGS. 7c and 7d illustrate a deflection limiting mechanism in operation.

DETAILED DESCRIPTION OF PREFERRED EMBODIMENTS

Figure 6A:
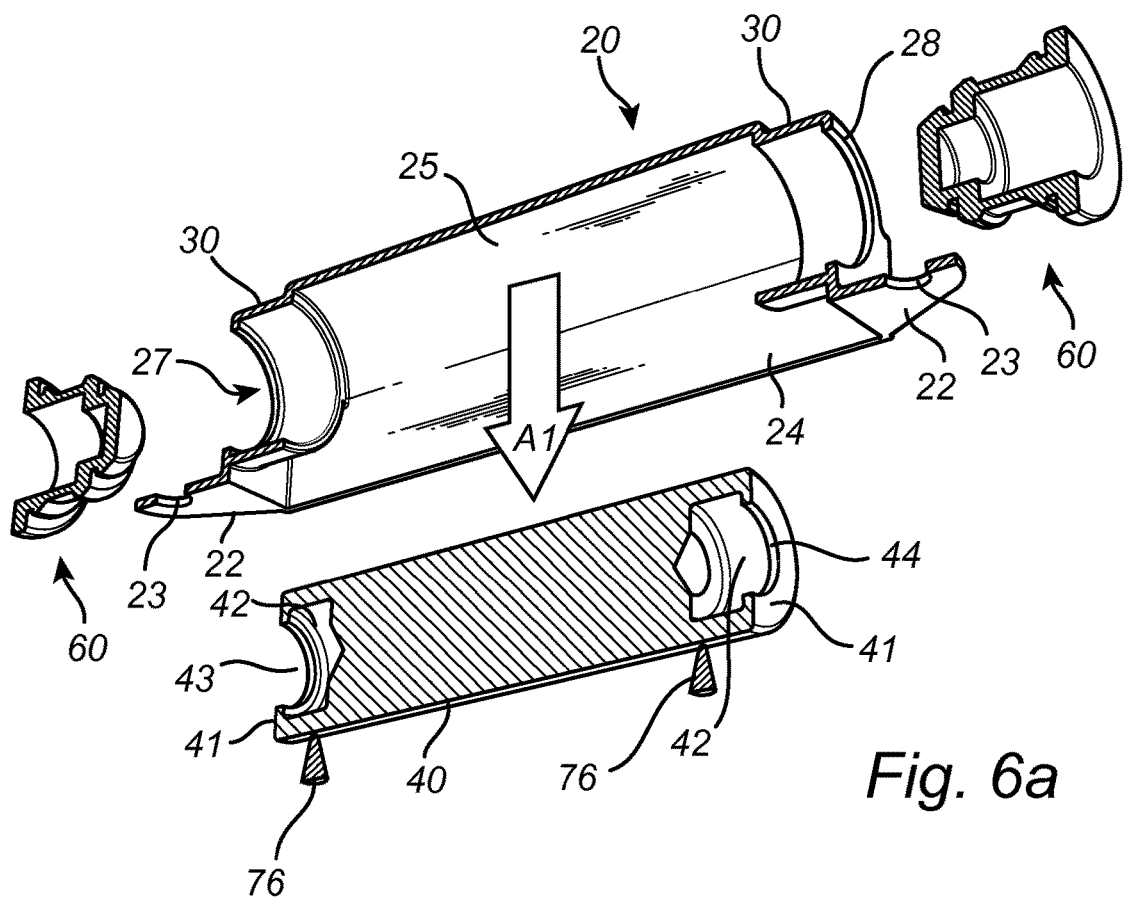
FIGS. 6a to 6c illustrate steps for assembling the damper shown in FIGS. 1 to 4.

The present inventive concept relates in general to frequency tuned dampers. Such dampers are used to dampen vibrations in a surface, such as a surface of a component in or the body of a motor vehicle (see e.g. reference numeral 81 in FIG. 7c). The damper comprises a mass acting as a vibration body, and at least one elastic element. The mass and the elastic element together provide a spring-mass system, and may be connected to the vibrating surface by means of an intermediary component, sometimes referred to as a console.

The mass of the vibration body, and the stiffness and damping of the elastic element are selected to provide a damping effect on the surface, which can be expected to vibrate at one or more predetermined target frequencies. When the surface vibrates at a target frequency, the vibration body is caused to oscillate/resonate at the same frequency as the surface, but out of phase with the surface, such that the vibration of the surface is substantially dampened. The vibration body may vibrate with an amplitude substantially greater than the vibration amplitude of the surface.

1$^{st}$ Embodiment

FIGS. 1 to 3 illustrate a first embodiment of a frequency tuned damper according to the inventive concept. The illustrated damper 10 may be used as a tailgate damper in a vehicle as schematically illustrated by a dashed circle 10 in FIG. 7c. The main components of the damper 10 include a console 20, a mass acting as a vibration body 40, and two elastic elements 60. The damper 10 extends along a longitudinal direction AD and may be used for damping vibrations in directions transvers to the longitudinal direction AD. The console 20 may be made e.g. from a plastic material (synthetic resin), metal or some other suitable material with the necessary strength and stiffness. The vibration body 40 may be made from cast iron, rod iron, or some suitable material presenting the required weight for the vibration damping function. The elastic elements 60 may be made from a suitable resilient material, such as silicone rubber.

In the illustrated embodiment, the console 20 comprises an elongate housing 21 extending in the direction AD, two connector tabs 22 at opposite ends of the housing 21 with connector holes 23 for connecting the damper to a surface (not shown), termed vibration surface, the vibrations of which are to be dampened. The housing 21 comprises two side walls 24 interconnected by a curved wall 25 with a semi-circular cross section. The housing 20 has an open side 26 opposite to the curved wall 25.

The console 20 further comprises two deflection limiters 30 arranged at axially opposite sides of the vibration body 40. In the illustrated embodiment, each deflection limiter 30 is in the form of a circular cylinder having a proximal end facing away from the interior of the housing 20, and a distal end facing towards the interior of the housing 21. The distance along the longitudinal direction AD between the distal ends of the deflection limiters 30 is such that the elongated vibration body 40 may be inserted through the open side 26 into the housing 21 to a final position between the deflection limiters 30, as indicated by an arrow A1 in FIG. 6a, and as shown in the final position in FIGS. 7a and 7b. In a preferred embodiment, the distance between the distal ends of the deflection limiters 30 may be essentially equal to but slightly larger than the length of the vibration body 40, as best seen in FIGS. 7a and 7b.

The console 20 further comprises two mounting openings 27, one at each longitudinal end of the console 20. Each mounting opening 27 is formed at the proximal end of an associated one of the deflection limiters 30, and is defined by a circular rim 28. In the illustrated embodiment, each mounting opening 27 is circular and is coaxial with the associated cylinder 30.

The housing 21, the two deflection limiters 30, and the two rims 28 defining the mounting openings 27 are integrally formed into one single console element 20 as best shown in FIG. 4. Specifically, an outer half of each cylinder 30 forms a continuation of the curved wall 25 in the longitudinal direction AD, but with a somewhat smaller diameter, while an inner half of each cylinder 30 is located between the planar side walls 24, which extend all the way to the proximal ends of the cylinders 30.

The vibration body 40 is shaped as a cylindrical rod with opposite ends 41. In each end 41, the vibration body 40 presents an inner cavity 42 (see FIG. 7b) for receiving a part of an associated elastic element 60. Each inner cavity 42 has an end opening 43 defined by an inwardly directed connector flange 44. The transvers or radial dimensions of the vibration body 40 are selected such as to avoid any direct contact between the vibration body 40 and the housing 21, such as indicated by the radial distance R1 in FIG. 7b.

The elastic elements 60 will now be described more in detail with reference to FIGS. 5a to 5d. Each elastic element 60 has a longitudinal axis AE, which in the assembled damper 10 coincides with the centre axis of the vibration body 40 and the centre axes of the vibration limiters 30. As indicated in the cross-sectional view in FIG. 5c, and as seen in the direction of the longitudinal axis AE, the elastic element 60 comprises a base portion 61 extending between axial levels L1 and L3, an intermediary transition or wall portion 62 extending between axial levels L3 and L4, and a top portion 63 extending between axial levels L4 and L7. In this embodiment, the base portion 61 and the top portion 63 form a wider portion and a narrower portion, respectively, of the elastic element 60.

The base portion 61 comprises a circumferentially extending first mounting groove 64, which is located at an axial level L2 and is defined by two opposite and radially extending side surfaces and a circumferentially extending inner bottom surface. The first mounting groove 64 is arranged to receive the rim 28 of an associated mounting opening 27 in the console 20 for connecting the elastic element 60 to the console 20 as illustrated in FIGS. 7a and 7b. In the illustrated embodiment, the mounting groove 64 is circular, i.e. the bottom surface of the groove 64 extends along a circle. In other embodiments, the mounting groove may have other configurations, such as elliptical as disclosed in the above-mentioned document WO 2013/167524 A1.

The intermediary wall portion 62 extends axially between the base portion 61 and the top portion 63. In the illustrated embodiment, the intermediary wall portion 63 has the shape of a circular cylinder having a wall thickness t. The intermediary wall portion 62 forms an essential part of the elastic element 60 with regard to the frequency tuning to one or more specified target frequencies. The tuning of the damper 10 may be done by varying design parameters of the intermediary wall portion 62, such as the wall thickness t, the axial length of the wall portion 62, the angle of the inside and/or the outside of the wall portion 62 in relation to the longitudinal axis AE, and the cross-section of the intermediary wall portion 62. These design parameters may vary between different axial planes and/or vary circumferentially about the axis AE.

The base portion 61 and the intermediary wall portion 62 together define a first larger part 65 of an inner cavity of the elastic element 60, extending between the levels L1 and L4. In the illustrated embodiment, this larger part 65 of the inner cavity has a circular cross section with a diameter D1, but may optionally be design with a non-circular cross section in other embodiments.

The top portion 63 extending between axial levels L4 and L7 presents a circumferentially extending second mounting groove 66 at an axial level L6 defined by two opposite side surfaces and an inner bottom surface. The second mounting groove 66 is arranged to receive an associated connector flange 44 of the vibration body 40 for connecting the elastic element 60 to the vibration body 40 as illustrated in FIGS. 7a and 7b.

The top portion 64 further comprises a part 67 at an axial level L5 presenting an increased radial thickness. The radially outer side of the part 67 defines an outer circumferentially extending impact surface 68 of the elastic element 60. In this example, the impact surface 68 is thus located at level L5 between the groove 66 at level L6 and the distal end of the intermediary wall portion 62 at level L4. It may be noted that in this embodiment, the impact surface 68 is part of the top portion 63. In an alternative embodiment, the part 67 presenting the impact surface 68 may be a portion of its own, located between the intermediary wall portion 62 and a top portion 63. As a general guide, the impact surface 68 of the elastic element 30 should preferably be located at an axial distance from the base portion 61, preferably at a distal side of the intermediary wall portion 62, such that the intended deflection limiting function operates at the distal side of the intermediary wall portion 62. The increased radial thickness of the part 67 at level L5 ensures that the elastic element 60 will not be damaged or substantially deformed when the impact surface 68 strikes against the deflection limiter 30. As shown in FIG. 5c, the part 67 has also an increased axial height for the same reason. Especially, the design should prevent excessive deformation of the top portion 63 to an extent which may involve risk of the top portion 63 being disconnected from the vibration body 40 when the impact surface 68 strikes against the deflection limiter 30.

In the illustrated embodiment, and in order to ensure that it will be impact surface 68 of the elastic element 60, and not any other part of the elastic element 60, which will strike against the deflection limiter 30, the diameter D3 of the circumferentially extending impact surface 68 is larger than the outer diameter of the intermediary wall portion 62. In other embodiments, the impact surface 68 may have a smaller outer diameter, and instead the deflection limiter 30 may have a radial inner extension at level L5 extending towards the impact surface 68 and terminating at a distance therefrom. The axial height H1 of the impact surface 68 is indicated in FIG. 7b. It could also be possible to have more than one impact surface 68, located at different axial levels. It may also be possible to design the impact surface 68 as a plurality of individual impact segments distributed circumferentially about the axis AE.

In order to facilitate the connection of the elastic element 60 to the console 20 and to the vibration body 40, the base portion 61 has a frustoconical part 70 located between the first mounting groove 64 and the intermediary wall portion 62, and the top portion 63 has a frustoconical part 71 located on a distal side of the second mounting groove 66.

A smaller part 69 of the inner cavity is located inside the top portion 63 of the elastic element 60. The diameters of the larger part 65 and the smaller part 69 are indicated by D1 and D2. During assembly, a suitable tool may be inserted into the smaller part 65 of the inner cavity for pressing the elastic element 60 into its connected final position as will be described below.

Figure 6B:
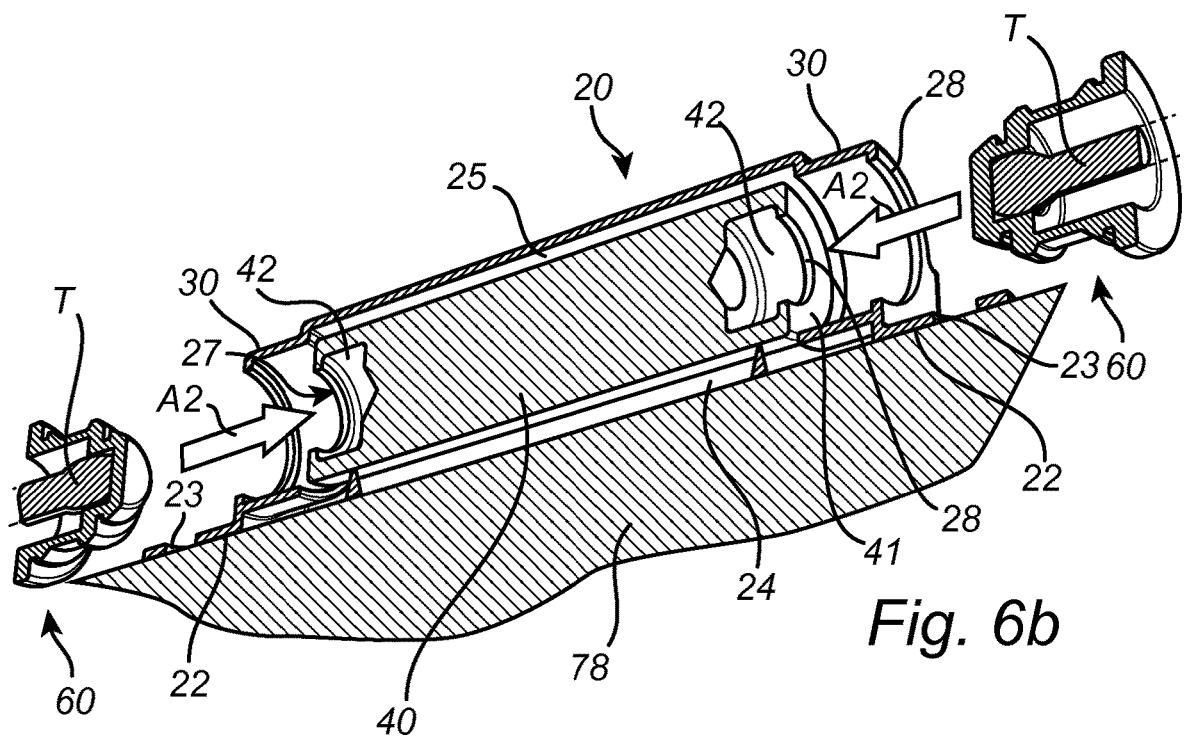
Figure 6C:
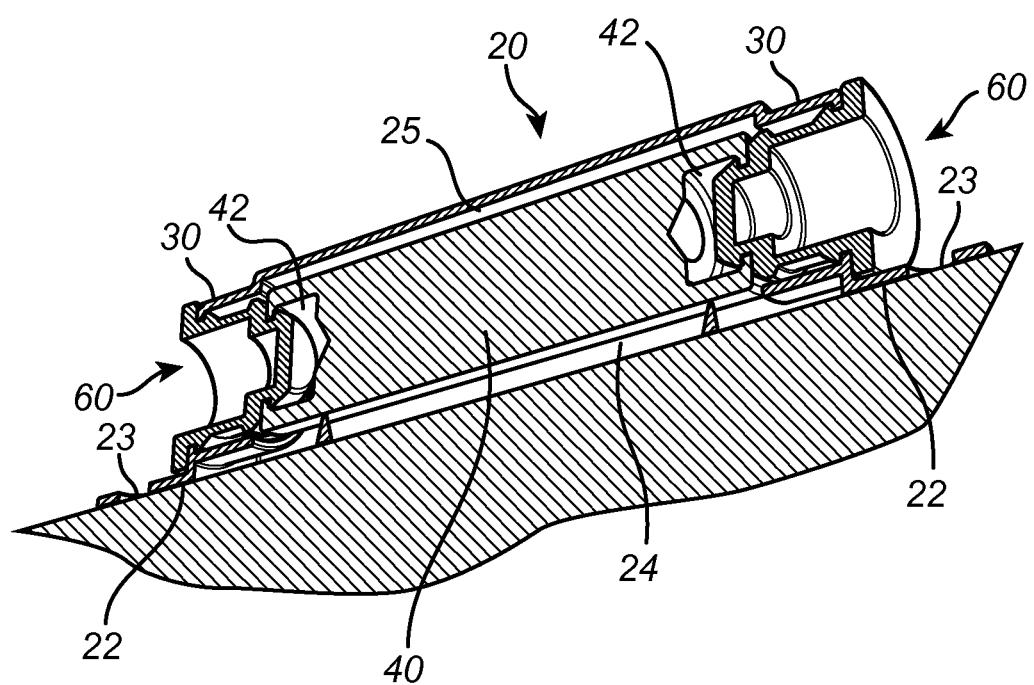
Figure 7A:
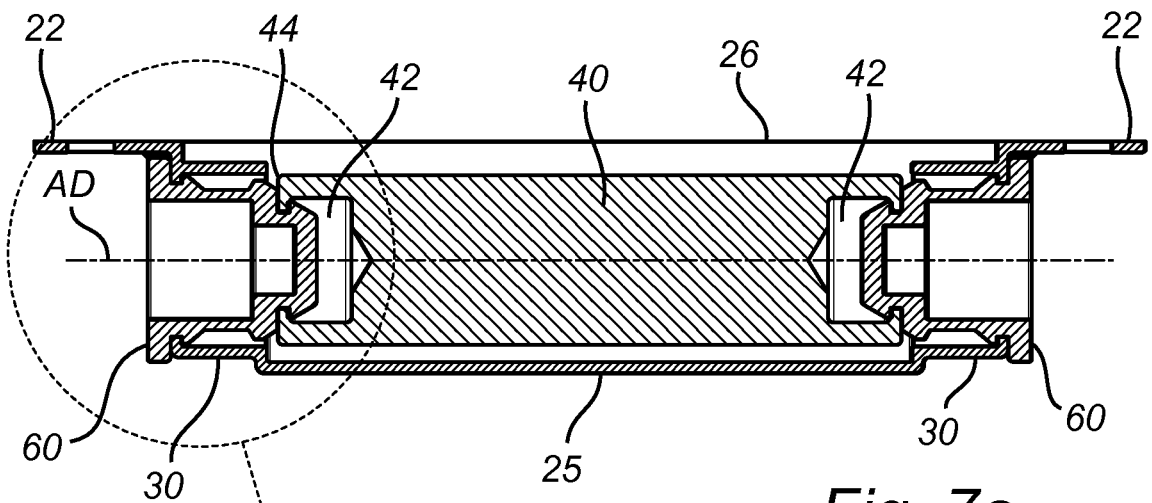
FIGS. 7a and 7b are sectional views of the assembled damper shown in FIGS. 1 to 4.
Figure 7B:
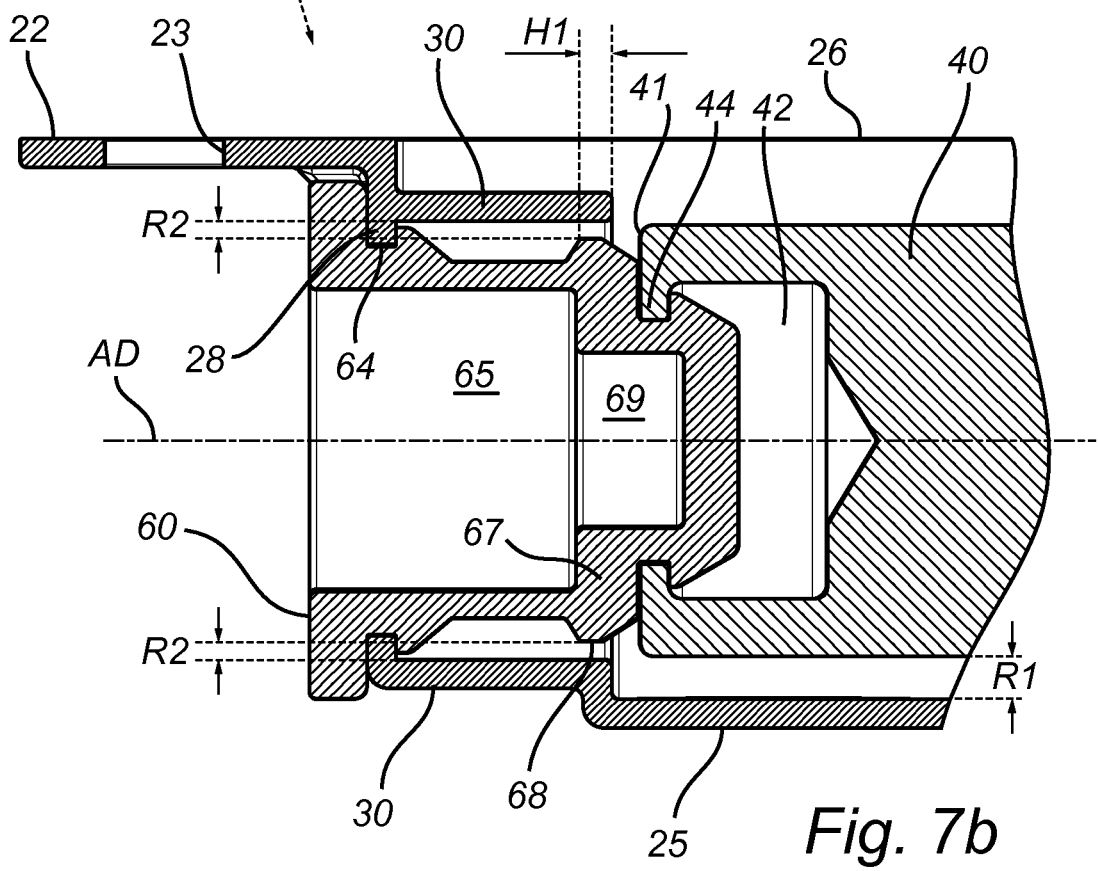

FIGS. 6a to 6c illustrate how the damper in FIGS. 1 to 4 may be assembled. The final damper is shown in FIGS. 6c and 7a, and in larger scale in FIG. 7b.

FIG. 6a illustrates the individual main components before the assembly of the damper 10 is initiated, including the console 20, the vibration body 40, and the two elastic elements 60. Thus, the complete damper 10, including the deflection limiting mechanism, can be made from four components only. In a first assembly state, the vibration body 40 is placed on a fixture or support schematically shown as small cones 76 in FIG. 6a. The console 20 is then lowered down with its open side 26 facing towards the vibration body 40, as indicated by an arrow A1. The console 20 is placed on a support or fixture 78 schematically shown in FIG. 6b such that the vibration body 40 is correctly positioned and aligned in the housing 21.

FIG. 6b illustrates by arrows A2 how the two elastic elements 60 thereafter are inserted into the associated mounting openings 27 of the console 20 and towards the ends 41 and cavities 42 of the vibration body 40. This may be performed by a plunger tool T inserted into the smaller part 69 of the inner cavity of each elastic element 60 and pressing against the closed top of the inner cavity.

FIGS. 6c, 7a and 7b illustrate the assembled damper 10. Each elastic element 60 has been inserted along the longitudinal axis AD to a final mounted position. During this single axial insertion movement of each elastic element 60, three things are established essentially at the same time: The elastic element 60 is connected to the console 20; the elastic element 60 is connected to the vibration body 40; and the deflection limiting mechanism is established. Specifically, the top portion 63 and the intermediary wall portion 62 will pass through the mounting opening 27 of the console 20, whereas the frustoconical part 70 of the base portion 61 will engage the rim 28 of the mounting opening 27, thereby slightly and temporarily deforming the base portion 61 so that the rim 28 may snap into the first mounting groove 64. Similarly, the frustoconical portion 71 of the top portion 63 will engage the connector flange 44 of the vibration body 40 in order to ensure that the connector flange 44 is received into the second mounting groove 66. Finally, regarding the establishment of the deflection limiting mechanism, the insertion of the elastic element 60 to its final mounted position will ensure that the impact surface 68 will be properly positioned at the distal end of the deflection limiter 30 at a radial distance R2 therefrom (see FIG. 7b).

In the assembled state in FIG. 7b, the vibration body 40 has no direct contact with the housing 21. The radial distance towards the curved wall 25 is indicated by R1. The distances R1 and R2 are preferably selected to prevent any direct contact between the vibration body 40 and the housing 21 during operation of the deflection limiting mechanism.

During normal operation of the frequency tuned damper 10, the damper 10 is arranged to dampen vibrations of the vibrating surface directed transversely to the longitudinal axis AD of the damper 10. During such normal operation of the damper 10, the inertia of the mass of the vibration body 40 will make the intermediary wall portion 62 and the intermediary wall portion 63 vibrate slightly in the transverse direction, involving a slight transverse deflection back and forth of the intermediary wall portion 62. The distance R2 in the deflection mechanism is preferably selected sufficiently large to prevent any deflection limitation during such normal damping operation. In other words, during normal damping operation, R2 will be greater than zero.

FIGS. 7c and 7d schematically illustrate the deflection limitation operation. As schematically shown by a dashed circle at the top of FIG. 7c, the damper 10 is mounted as a tailgate damper on the inside of a tailgate 81 of a motor vehicle 80, and the vehicle 80 is passing a pothole 82 in the road. As a result of the wheels going down into and up from the pothole 82, the damper 10 will be subjected to relatively large transient forces in directions transvers to the longitudinal direction AD of the damper 10. Due to the inertia of the mass of the vibration body 40, the vibration body 40 will first move downwards as indicated by an arrow A3 in FIG. 7c, and thereafter upwards as indicated by an arrow A4 in FIG. 7d. In this situation, and if the external transient forces are strong enough, the deflection limiting mechanism will operate. A lower part of the impact surface 68 will first hit or strike against a lower part of the frequency delimiter 30, as indicated by an arrow A5 in FIG. 7c. This will prevent further excessive transverse movement of the elastic element 30 and the vibration body 40. The distance R1 in FIG. 7c is reduced to a distance R3, where R1>R3>0. Thereafter, as the vibration body 40 tends to move upwards relative to the console 20 towards the open side 25 of the housing 21 as indicated by the arrow A4 in FIG. 7d, an upper part of the deflection mechanism 68/30 will operate as indicated by an arrow A6 in FIG. 7d, preventing again excessive transversal movement of the elastic element 30 and the vibration body 40. In this position, the vibration body 40 will present a radial distance R4 to the curved wall 25, where R4>R1.

2$^{nd}$ Embodiment

Figure 8A:
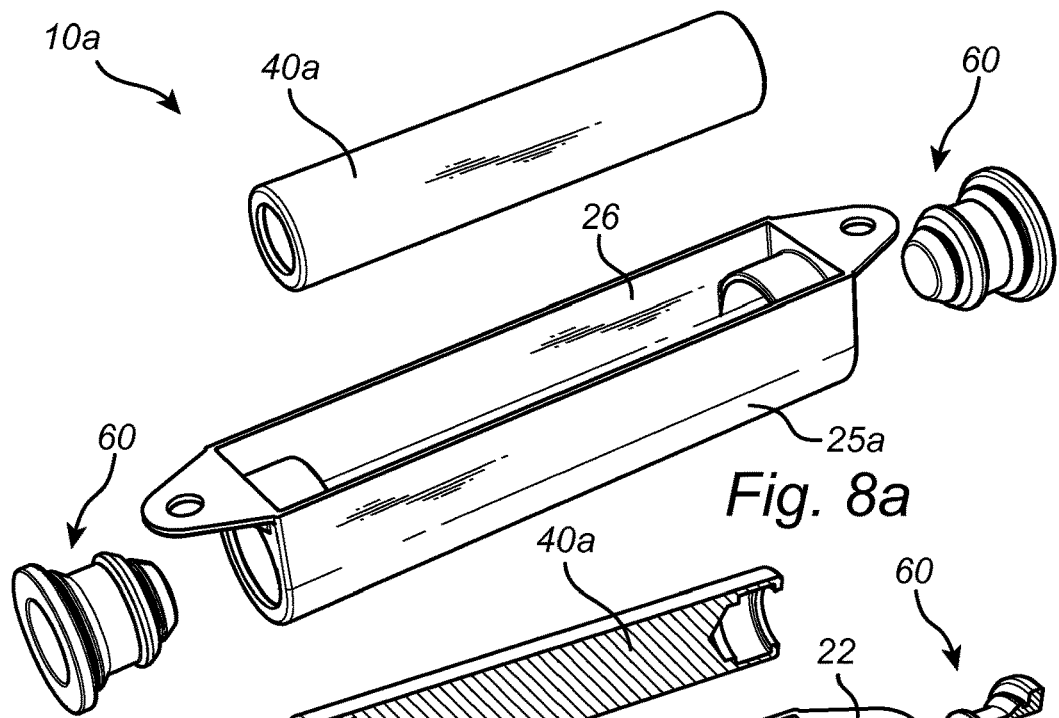
FIGS. 8a to 8c illustrate a second embodiment of a frequency tuned damper.
Figure 8B:
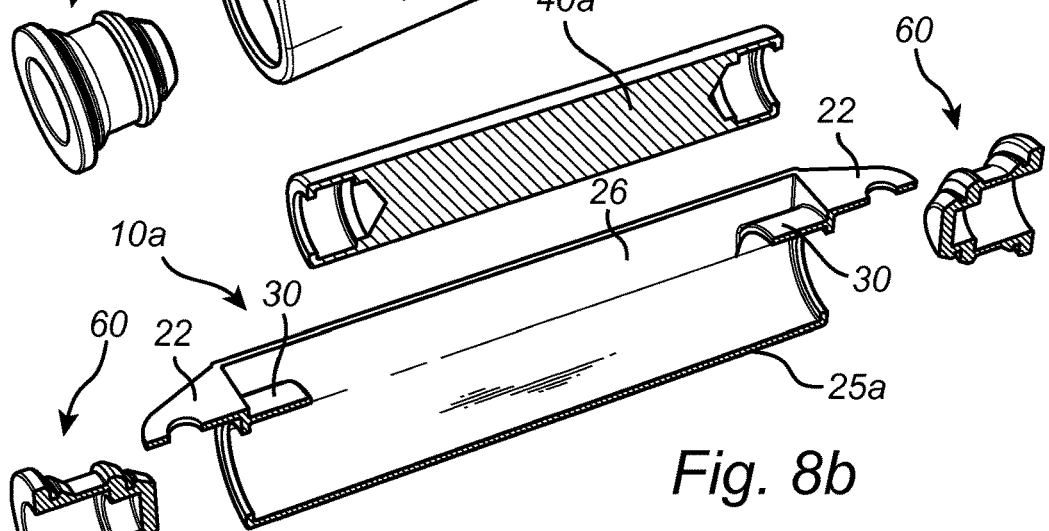
Figure 8C:
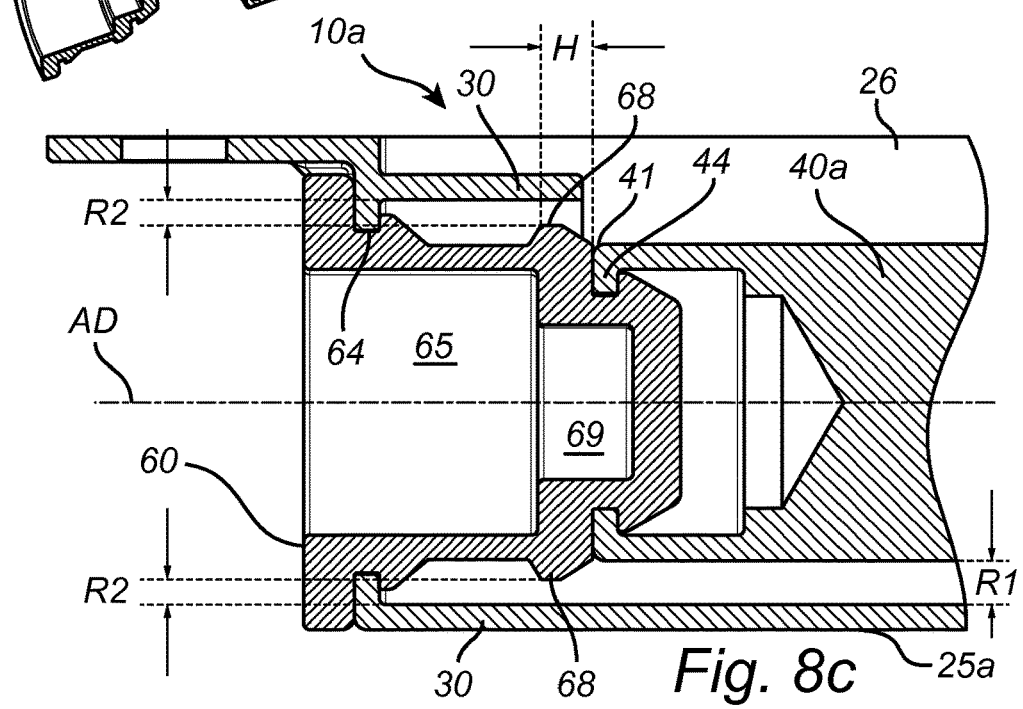

FIGS. 8a to 8c illustrate a second embodiment of a frequency tuned damper 10a according to the inventive concept. This embodiment is in all essential aspects similar to the first embodiment. The only difference is that the second embodiment is designed for a vibration body 40a having a smaller diameter than the vibration body 40 in the first embodiment. The housing 21 is therefore of reduced size, and the reduced outer diameter of the curved wall 25a of the housing 21 is in this embodiment equal to the outer diameter of the cylinders 30, forming a continuous curved side along the entire length of the damper 10a.

3rd Embodiment

FIGS. 9a to 9d illustrate a third embodiment of a frequency tuned damper 10b according to the inventive concept. This second embodiment differs in two aspects from the first and second embodiments.

First, the console in this embodiment does not have any housing enclosing the vibration body 40. Instead, the console comprises an essentially U-shaped, integrally formed, essentially plate-shaped base element 90. The base element 90 has longitudinally extending side wall 91, two transversally extending end walls 92 each having an opening 93, and two connector tabs 22 arranged for connecting the base element 90 to the vibrating surface. The base element 90 can be made from any suitable material, such as a bent metal element or a plastic material.

Second, the console in this embodiment is not made in one single, integrally formed piece as in the first and second embodiments. Instead, the mounting rim 28 and the deflection delimiter 30 for each elastic element 60 are integrally formed as a separate sleeve-shaped element 100, separate from the base element 90. In the present disclosure, the sleeve-shaped element 100 is described as forming part of the console. The console in this embodiment is made up of three components: The U-shaped base element 90, and two sleeve-shaped elements 100.

Each sleeved-shaped element 100 presents a rim 28 defining a mounting opening 27 for an associated elastic element 60, and a deflection limiter 30 which is integrally formed with the rim 28 and which is formed as a cylinder as in the previous embodiments. Each sleeve-shaped element 100 also comprises a locking notch 31 on the outer circumferential side of the cylinder, close to the rim 28. The outer diameter of the sleeve-shaped element 100 corresponds to the diameter of the opening 93 in the end wall 92 of the base element 90. When the sleeve-shaped element 100 is inserted through the associated opening 93, its final connected position is obtained when the locking notch 31 passes through the opening 93 as best shown in FIG. 9c.

According to the same principle as described in the first embodiment, also in this embodiment the deflection limiting mechanism is established automatically and correctly when the elastic element 60 is inserted through the mounting opening 27 to its connected position where the rim 28 of the sleeve-shaped element 100 engages the first mounting groove 64. The sleeve-shaped element 100 can be made from any suitable material, such as a plastic material.

Figure 9A:
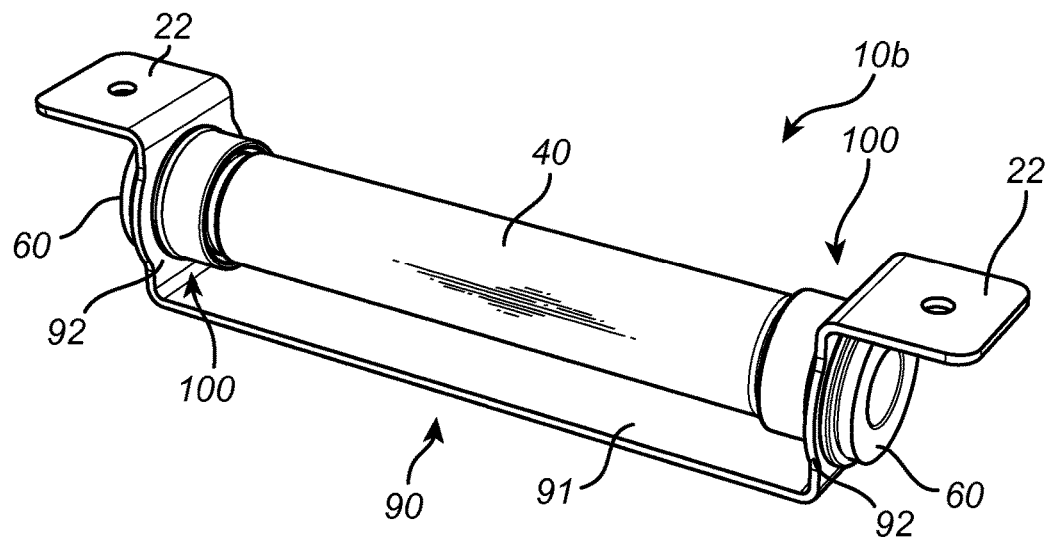
FIGS. 9a to 9d illustrate a third embodiment of a frequency tuned damper.
Figure 9B:
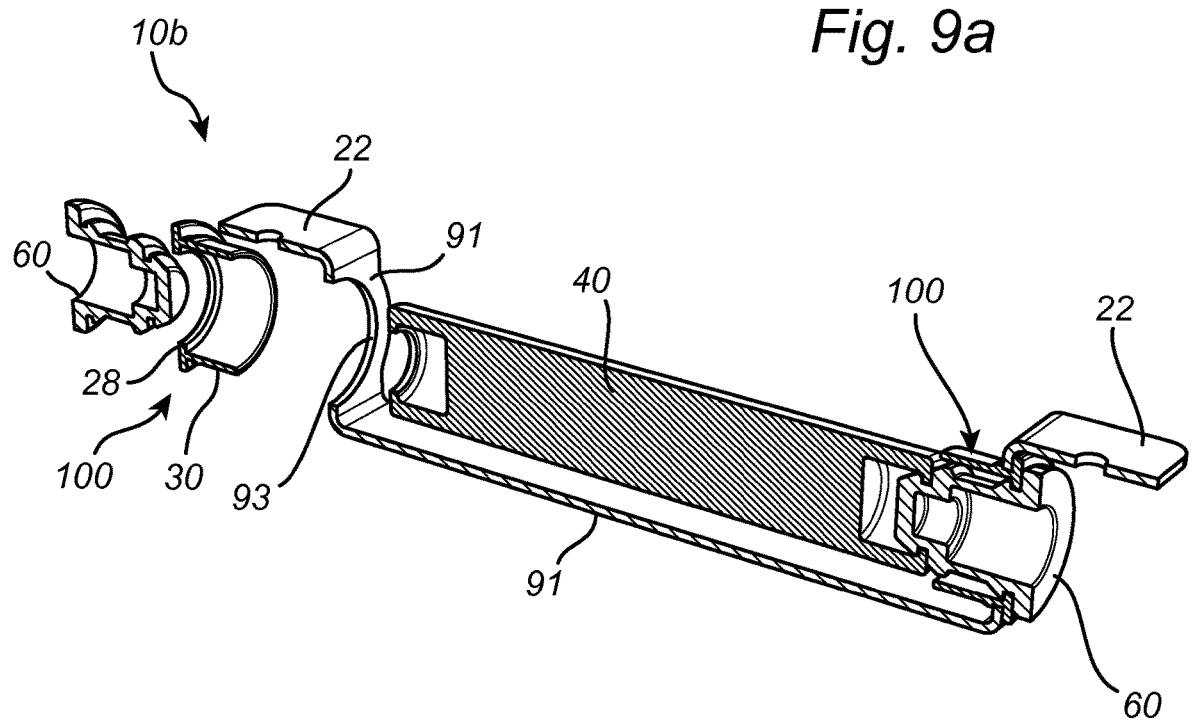
Figure 9C:
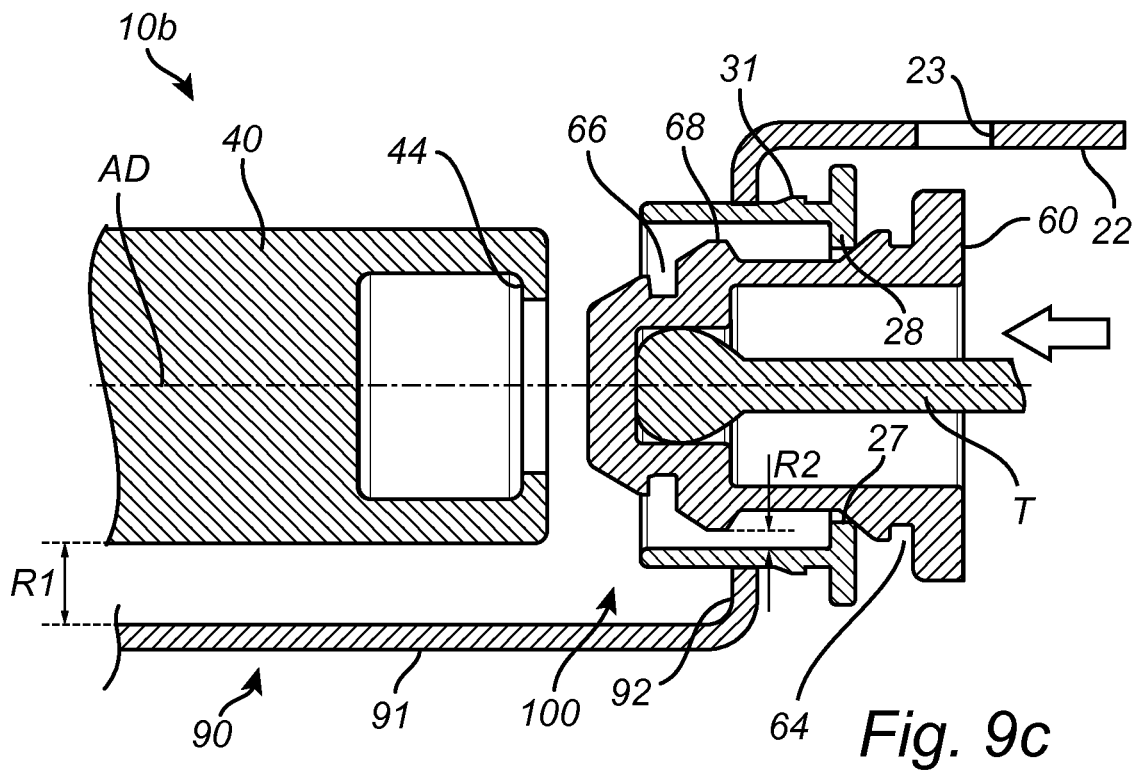
Figure 9D:
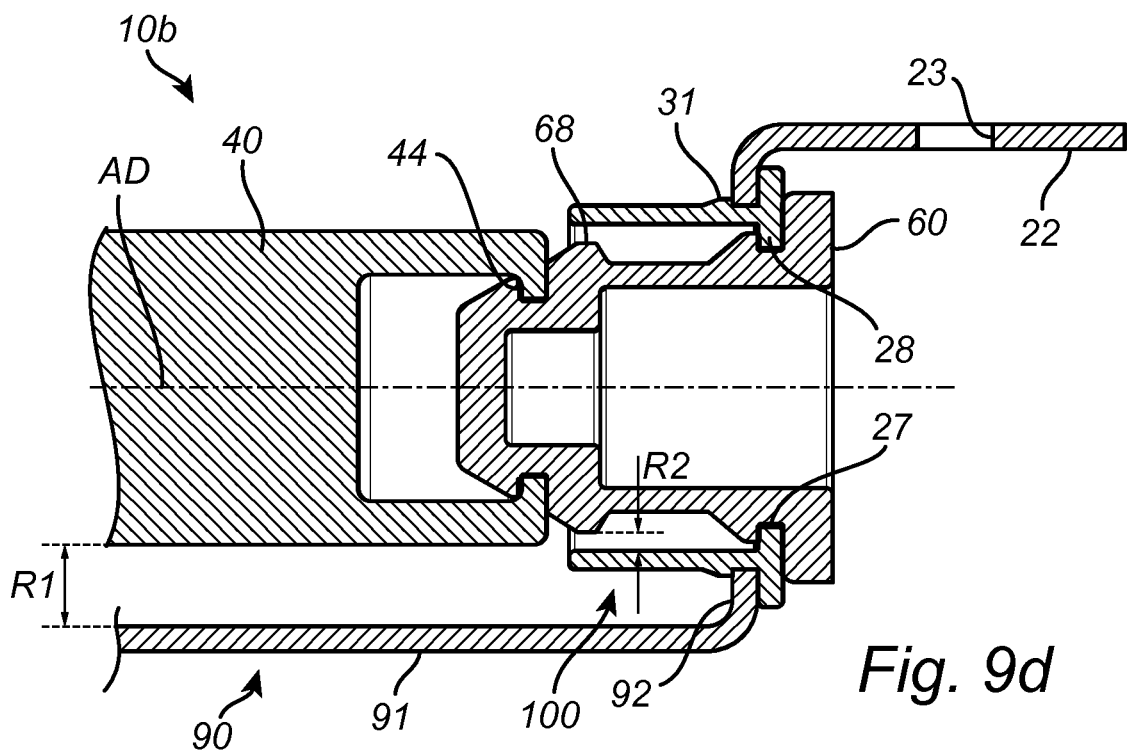

The damper 10b in FIGS. 9a to 9c may be assembled according to different alternatives:

According to a preferred first assembly alternative illustrated in FIGS. 9c and 9d, the components are first lined up (FIG. 9c) in relation to each other by loosely inserting each sleeve element 60 into its associated opening 93 in the base element 90, loosely inserting each elastic element 60 into its associated sleeve element 100, and positioning the vibration body 40 in relation to the base element 90. When the components have been lined up, each elastic element 60 is then pushed by a plunger tool T (FIG. 9c) into its connected position (FIG. 9d), such that the mounting grooves 64 and 66 of the elastic element 60 engage with the sleeve element 100 and the vibration body 40, respectively, and such that the elastic element 60 at the same time pushes the sleeve element 100 into its mounted position where it is connected to the base element 90.

According to a second assembly alternative, first each elastic element 60 is inserted into and connected to its own sleeve element 100. This may be performed beforehand. Thereafter, the sleeve element 100 with its pre-connected elastic element 60 may be inserted into an opening of the base element 90 and secured to the base element 90, while the top portion 63 of the elastic element 60 at the same time is connected to the vibration body 40. This second assembly alternative may be the preferred alternative for large volumes.

According to a third assembly alternative, first each sleeve element 100 is inserted into and connected to the base element 90. Thereafter, each elastic element 60 is inserted into and connected to its associated sleeve element 100 and connected to the vibration body 40.

4$^{th}$ Embodiment

FIGS. 10a to 10d illustrate a fourth embodiment of a frequency tuned damper 10c according to the inventive concept. One main difference between this embodiment and the previous embodiments is that all the elastic elements 60 are located on one side of the vibration body.

Figure 10A:
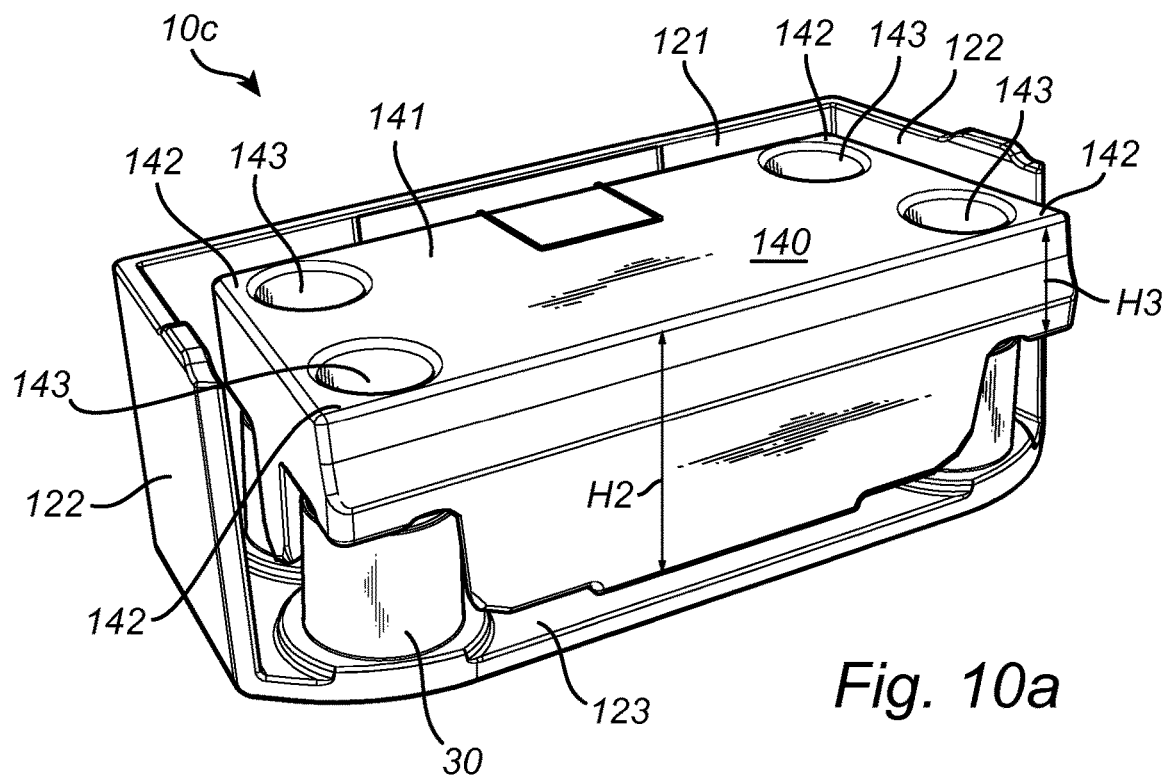
FIGS. 10a to 10d illustrate a fourth embodiment of a frequency tuned damper.
Figure 10B:
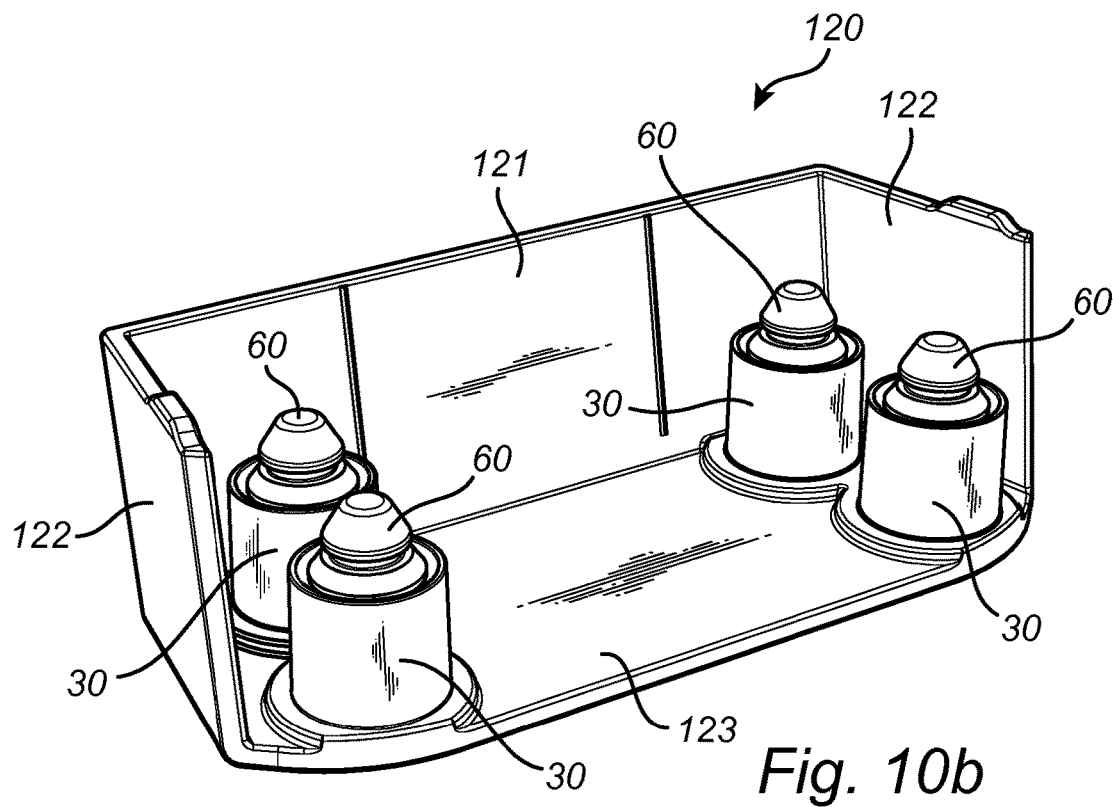

As shown in FIG. 10b, the damper 10c comprises a housing 120 having a side wall 121, two opposite end walls 122, and a bottom wall 123. The top side and the side opposite to the side wall 121 are both open. The housing 120 may be fastened to the vibrating surface by means of self-threading screws (not shown). A plurality of deflection delimiters 30 are integrally formed with the bottom wall 123 and extend essentially along a normal direction of the bottom wall 123 and at spaced distances from each other. The illustrated embodiment 10c comprises four deflection delimiters 30 arranged in a rectangular configuration. As described above in connection with the previous embodiments, each one of the four deflection limiters 30 is arranged to receive a corresponding elastic element 60 as shown in FIG. 10b.

Figure 10C:
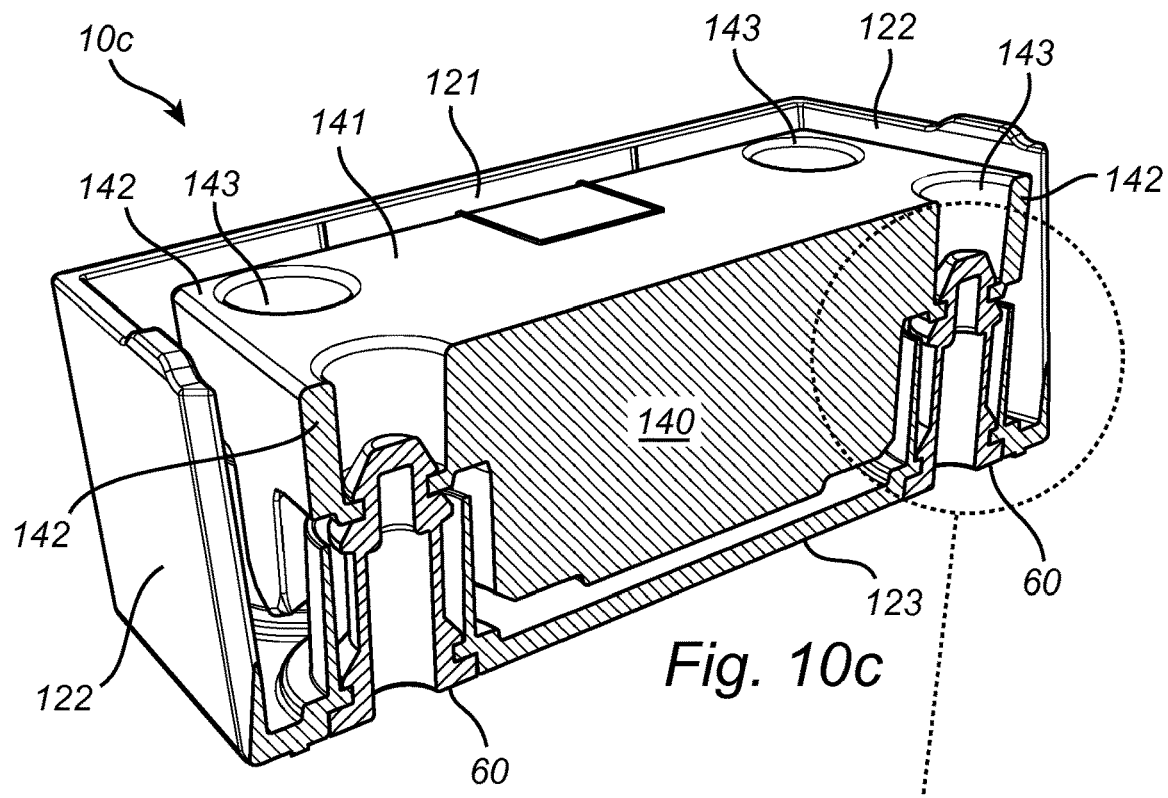
Figure 10D:
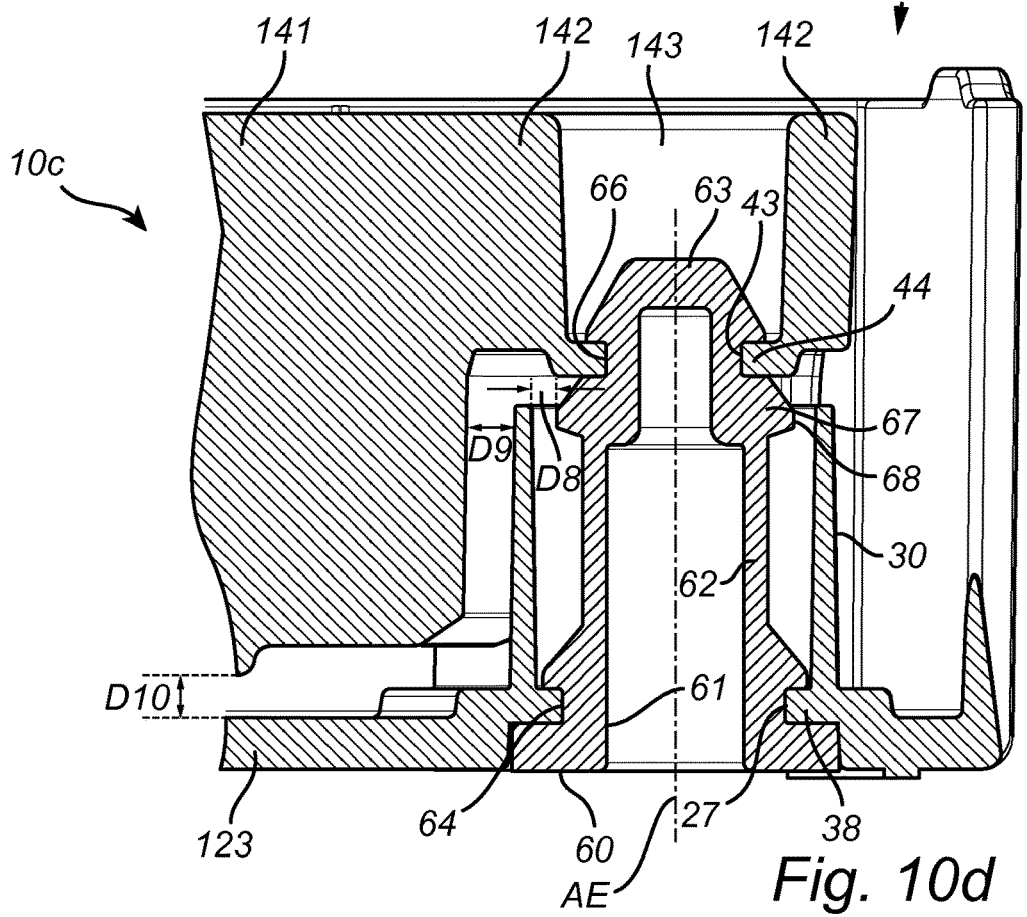

The damper in FIGS. 10a to 10d further comprises a vibration body 140 the design of which includes a main or centre part 141 with a larger height H2, and four corner parts 142. Each corner part 142 has a smaller height H3<H2 and a through hole 143. In the assembled damper 10c as shown in FIGS. 10c and 10d, each corner part 143 is supported above an associated deflection limiter 30 with the through hole 143 aligned with the longitudinal axis AE of an associated elastic element 60 connected to the corner part 142. Each corner part 142 presents a connector flange 44 which is located at the bottom end of the through hole 143 and connected as described above to the mounting groove of the top portion 63 of the elastic element 60. With respect to the deflection limiting mechanism, the relevant distance is indicated at D8 in FIG. 10d. The distance D8 is preferably selected such that direct contact between the vibration body 140 and the housing 120 is avoided when the deflection limiting mechanism is in operation. Thus, the distance D9 in FIG. 10d should be selected such that D9>D8.

5th Embodiment

Figure 11A:
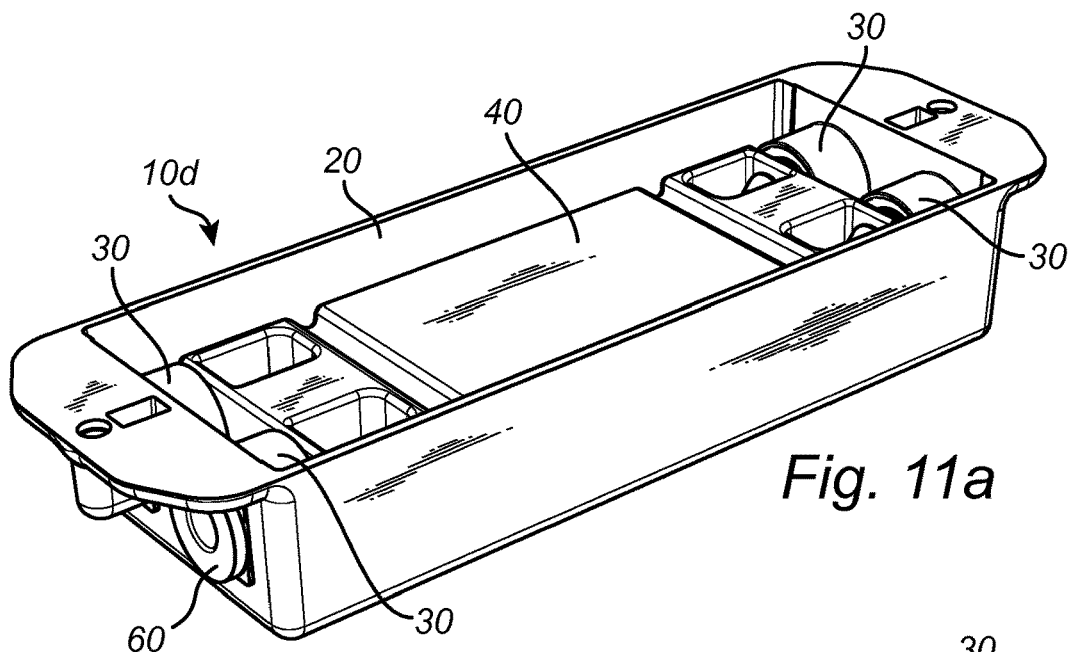
FIGS. 11a to 11c illustrate a fifth embodiment of a frequency tuned damper.
Figure 11B:
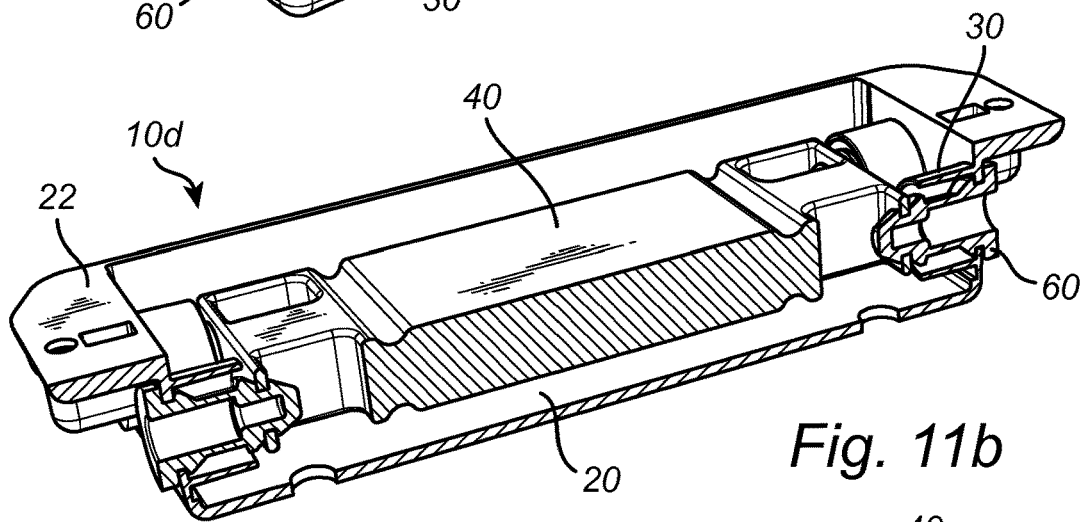
Figure 11C:
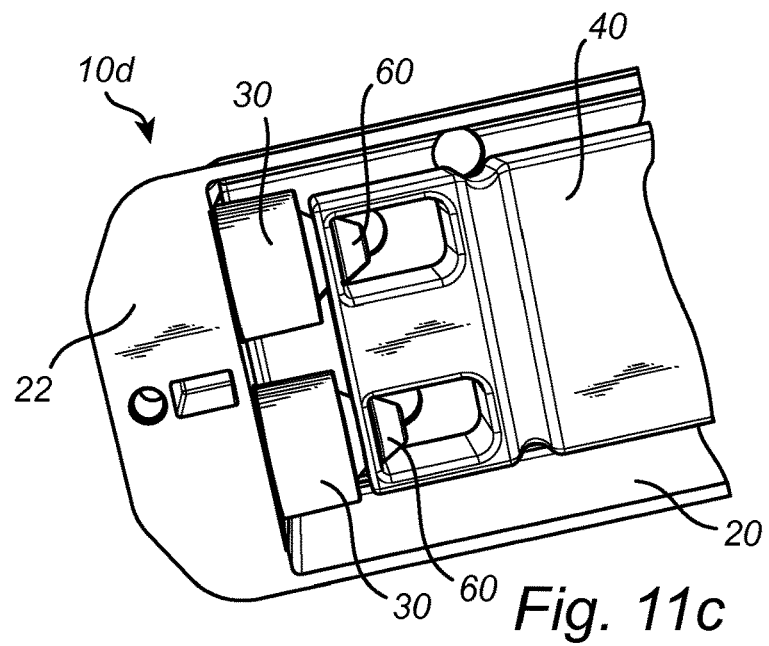

FIGS. 11a to 11c illustrate a fifth embodiment of a frequency tuned damper 10d according to the inventive concept. This embodiment is to some extent a combination of the first embodiment in FIGS. 1 to 4 and the fourth embodiment in FIGS. 10a to 10d in that the vibration body 40 is supported by elastic elements 60 on opposite sides as in the first embodiment and also supported by more than one elastic element 60 on each side as in the fourth embodiment. An advantage of the damper 10d in FIGS. 11a to 11c is that the multiple elastic elements 60 with the associated deflection limiters 30 will prevent also excessive torsional movements of the vibration body 40, i.e. excessive rotation about the longitudinal axis of the vibration body 40.

Alternative Embodiments

The embodiment described above and as shown in the figures may be varied in many ways without departing from scope of the claims.

Figure 12:
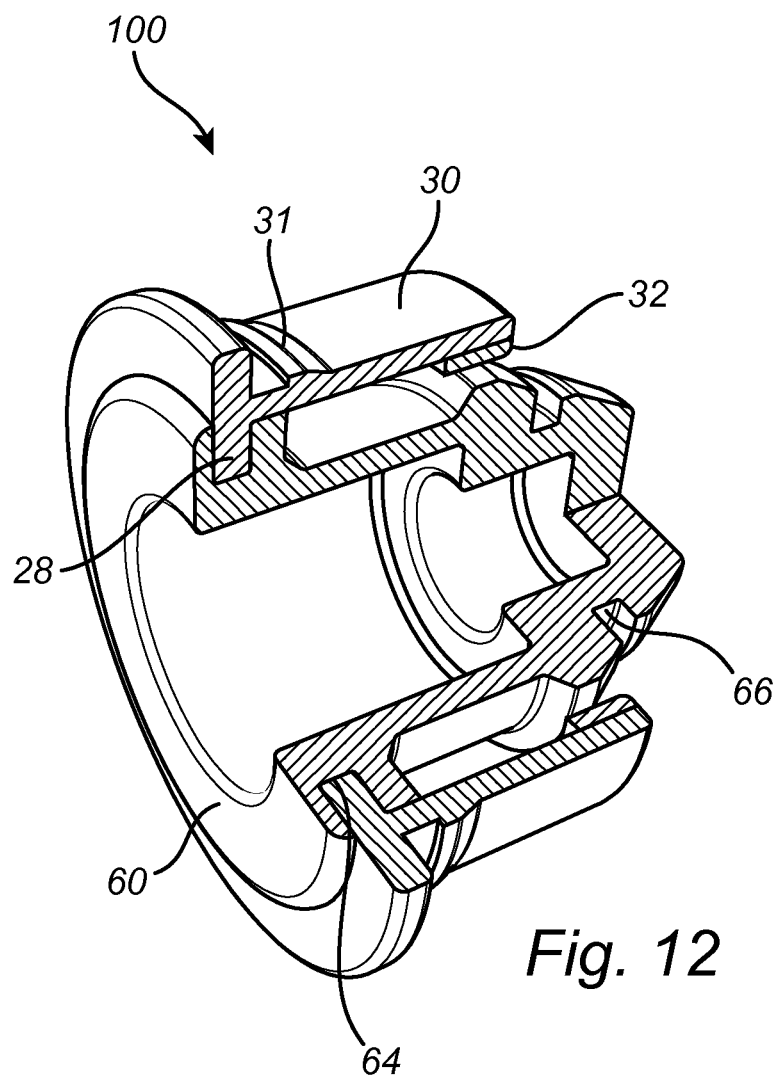
FIG. 12 illustrates an alternative embodiment of a sleeve-shaped element.

In the embodiments described above, the impact surface 68 is arranged to hit or strike directly against the inner surface of the associated deflection limiter 30 integrally formed with the rim 28. If the part of the console which forms the deflection limiter 30 is made of e.g. a plastic material, the damping effect between the deflection limiter 30 and the impact surface 28 or the elastic element 60 may be sufficient. However, if for instance the console or housing is made from a hard and very rigid material, such as metal, it may be possible to insert a further damping element on the inside of the deflection limiter as shown at reference numeral 32 in FIG. 12.

In alternative embodiments, the deflection limiter is not designed as a closed cylinder all the way to the base portion of the elastic element. As an example, one may consider embodiments where the functional part of the deflection limiter 30 has the shape of a ring-shaped wall which is located in level with the impact surface 68 of the elastic element 60, and which has a limited extension in the direction of the longitudinal axis AE. Such a ring-shaped wall may be integrally formed with the rim 28 in various ways, for instance via some more open structure or legs extending between the ring-shaped wall and the part of the console in which the mounting opening is located.

It may also be possible to design the deflection limiter 30 as separate segments distributed circumferentially about the impact surface 68. In some embodiments, the deflection limiter 30 may extend about the top portion 63 less than 360 degrees.

Further, it may be possible to arrange two or more deflection limiting mechanisms involving the same elastic element, where the different deflection limiting mechanisms optionally may operate in different directions.

The first embodiment in FIGS. 1 to 3 and the third embodiment in FIGS. 9a to 9d may be combined: The first embodiment in FIGS. 1 to 3 comprising a housing 21 may also include separate sleeve-shaped elements 100 in which the mounting rim 28 and the deflection limiter 30 are integrally formed, and the console in FIGS. 9a to 9d may comprise a housing also.

The elastic elements 60 may be configured in various ways. The basic design of the elastic elements 60 may as preferred examples be chosen in accordance the designs disclosed in the above-mentioned documents WO 01/92752 A1, WO 2013/167524 A1, and WO 2008/127157 A1. However, such prior-art designs may be modified especially with respect to the design of the impact surface and the thickness of the section of the elastic element forming the impact surface.

In some embodiments, the elastic elements 60 may be connected to the vibration body 40 by alternative techniques. One technique is to vulcanize the vibration body 40 to the elastic elements 60, which however may be a more time-consuming and expensive attachment method.

In some embodiments, the vibration body 40 is not merely a dead weight as in the illustrated embodiments. The vibration body 40 may be formed, in its entirety or at least partly, by some component having the necessary weight, such as a gas generator in an air-bag module.

In some embodiments, the inner surface of the deflection limiter 30 is a non-smooth surface. For instance, the inner surface may be provided with grooves or splines, or may be formed in segments, in order to reduce the area of contact with the impact surface 68 or the elastic element 60.

The invention claimed is:

1. A frequency tuned damper comprising:
a console configured to be connected to a vibrating surface, vibrations of which are to be dampened, said console comprising at least one mounting opening defined by an associated mounting rim;
a vibration body; and
at least one elastic element having a longitudinal axis and comprising a base portion having a first circumferentially extending mounting groove in which the associated mounting rim is received to connect the elastic element to the console, and a top portion which is located at a distance along the longitudinal axis from the base portion, and is connected to the vibration body,
wherein the elastic element includes a circumferentially extending outer impact surface, which is provided at a location between the base portion and the vibration body, and
wherein the console further includes at least one deflection limiter which is integrally formed with the associated mounting rim and extends circumferentially around the impact surface at a distance therefrom, said deflection limiter being arranged to limit the degree of movement of the elastic element transversally to the longitudinal axis when the damper is subjected to an external transient force sufficient to bring the impact surface into contact with the deflection limiter, thereby preventing excessive movements of the elastic element transversally to the longitudinal axis.

2. The damper as claimed in claim 1, wherein:
said at least one mounting opening includes a plurality of mounting openings, each mounting opening defined by an associated mounting rim,
said at least one elastic element includes a plurality of elastic elements, each elastic element being connected to the console at one of the associated mounting rims, and
said at least one deflection limiter includes a plurality of deflection limiters, each deflection limiter being integrally formed with the one of the associated mounting rims and extending circumferentially around the impact surface of an associated one of the elastic elements at a distance therefrom.

3. The damper as claimed in claim 2, wherein said plurality of elastic elements includes a first elastic element and a second elastic element which are connected to the vibration body on opposite sides of the vibration body, and are aligned along a common longitudinal axis, and wherein said plurality of deflection limiters includes a first deflection limiter associated with the first elastic element and a second deflection limiter associated with the second elastic element.

4. The damper as claimed in claim 2, wherein said plurality of elastic elements comprises two or more elastic elements of which the longitudinal axes are parallel and non-coinciding and which are connected to a common surface of the console and to a common side of the vibration body.

5. The damper as claimed in claim 2, wherein the console includes a housing in which the vibration body is arranged and supported by the said plurality of elastic elements, and wherein the distance between each deflection limiter and the impact surface of the associated one of the elastic elements is selected sufficiently small to ensure that the vibration body is prevented from striking against said housing when the damper is subjected to said external transient forces.

6. The damper as claimed in claim 5, wherein said housing has at least one open side through which the vibration body is insertable into the housing during assembly of the damper, and wherein said plurality of deflection limiters are located at a distance from each other allowing the vibration body to be inserted through said open side of the housing into a position between said plurality of deflection limiters.

7. The damper as claimed in claim 1, wherein the at least one elastic element includes an increased outer diameter at said impact surface relative to another portion of the elastic element, in order to ensure that a deflection-limiting contact with the at least one deflection limiter will occur at the location of the impact surface when the damper is subjected to said external transient forces.

8. The damper as claimed in claim 1, wherein said at least one deflection limiter extends circumferentially 360 degrees around the impact surface.

9. The damper as claimed in claim 1, wherein said at least one deflection limiter includes a cylindrical wall extending along the at least one elastic element at a distance therefrom and having a proximal end which is integrally formed with a surface of the console in which the associated mounting rim is formed, and an opposite distal end located at the impact surface of the elastic element.

10. The damper as claimed in claim 1, wherein said at least one elastic element is received in and connected to a sleeve element which forms part of the console, and in which the at least one deflection limiter and the rim are integrally formed, and wherein the sleeve element is received in an opening of a base element of the console, said base element being configured to be connected to the vibrating surface.

11. The damper in claim 1, wherein the at least one elastic element includes an intermediary wall portion extending between the base portion and the top portion, and wherein the impact surface is at least partly formed in the top portion.

12. The damper as claimed in claim 11, wherein the impact surface of the top portion is located at a position along the longitudinal axis where the top portion has a wall thickness which is greater than a wall thickness of the intermediary wall portion.

13. The damper as claimed in claim 1, wherein the base portion of said at least one elastic element forms a wide portion of the elastic element and the top portion of said at least one elastic element forms a narrow portion of the elastic element relative to the wide portion.

14. The damper of claim 1, wherein the top portion of said at least one elastic element has a circumferentially extending second mounting groove;

wherein the vibration body includes a mounting opening defined by an inwardly extending flange which is received in the second mounting groove of the top portion to connect the elastic element to the vibration body; and wherein the impact surface is located axially between the first mounting groove and the second mounting groove.

15. A method for use in manufacturing a frequency tuned damper, comprising:

inserting an elastic element, which has a base portion and a top portion located at a distance along a longitudinal axis from the base portion, through a mounting opening of a console to a mounted position in which the base portion is connected to the console, and in which a deflection limiter of the console extends circumferentially about and at a distance from an outer impact surface of the elastic element, wherein the deflection limiter and the impact surface in said mounted position together form a deflection limiting mechanism to prevent excessive movements of the elastic element transversally of the longitudinal axis; and attaching the top portion of the elastic element to a vibration body, wherein the elastic element and the vibration body together form a frequency tuned spring-mass system.

16. The method as claimed in claim 15, wherein inserting the elastic element to said mounted position and attaching the top portion to the vibration body are performed by one single linear movement of the elastic element in relation to the console and the vibration body.

17. The method as claimed in claim 16, wherein the base portion of the elastic element is connected to the console at substantially the same time that the top portion of the elastic element is attached to the vibration body.

18. The method as claimed in claim 15, wherein the deflection limiter is integrally formed with the console.

* * * * *